(12) United States Patent
Gilbert et al.

(10) Patent No.: US 10,421,587 B2
(45) Date of Patent: Sep. 24, 2019

(54) BEVERAGE CONTAINER CLOSURE

(71) Applicant: Pacific Market International, LLC, Seattle, WA (US)

(72) Inventors: Tyler Sean Gilbert, Bellevue, WA (US); Randy Sims, Franklin, TN (US)

(73) Assignee: Pacific Market International, LLC, Seattle, WA (US)

( * ) Notice: Subject to any disclaimer, the term of this patent is extended or adjusted under 35 U.S.C. 154(b) by 0 days.

(21) Appl. No.: 15/949,594

(22) Filed: Apr. 10, 2018

(65) Prior Publication Data

US 2018/0222641 A1    Aug. 9, 2018

Related U.S. Application Data

(63) Continuation-in-part of application No. 15/080,137, filed on Mar. 24, 2016, now Pat. No. 10,023,366,
(Continued)

(51) Int. Cl.
*B65D 47/24* (2006.01)
*B65D 51/18* (2006.01)
(Continued)

(52) U.S. Cl.
CPC ....... *B65D 47/245* (2013.01); *A47G 19/2272* (2013.01); *A47J 41/0022* (2013.01);
(Continued)

(58) Field of Classification Search
CPC .. B65D 47/247; B65D 47/245; B65D 47/248; B65D 47/249
(Continued)

(56) References Cited

U.S. PATENT DOCUMENTS 118,860 A    9/1871    Kent
404,192 A    5/1889    Haas
(Continued)

FOREIGN PATENT DOCUMENTS

CN    2198839 Y    5/1995
CN    2210160 Y    10/1995
(Continued)

OTHER PUBLICATIONS

Extended European Search Report dated Jan. 22, 2013, European Patent Application No. 12183461.8, filed Sep. 7, 2012, eight pages.
(Continued)

*Primary Examiner* — Jeffrey R Allen
*Assistant Examiner* — Jennifer Castriotta
(74) *Attorney, Agent, or Firm* — Davis Wright Tremaine LLP; George C. Rondeau, Jr.

(57) ABSTRACT

A beverage container closure or lid that is adapted for closing an open end of a beverage container. The lid is selectively couplable to the beverage container and includes a selectively openable stopper that when closed, creates a fluid-tight seal between the beverage container and the environment. The stopper may be selectively opened by a user by the user pressing a button disposed on a side of the beverage container closure. The stopper is subsequently automatically closed when the user releases the button. Thus, a user may open and close the beverage container closure using a single hand without the need to remove the beverage container closure from the beverage container.

61 Claims, 12 Drawing Sheets

Related U.S. Application Data which is a continuation of application No. 14/279,179, filed on May 15, 2014, now Pat. No. 9,375,107, which is a continuation of application No. 13/749,310, filed on Jan. 24, 2013, now Pat. No. 8,746,496, which is a continuation of application No. 12/946,501, filed on Nov. 15, 2010, now Pat. No. 8,360,258.

(51) Int. Cl.
| | |
|---|---|
| *B65D 47/32* | (2006.01) |
| *B65D 50/06* | (2006.01) |
| *B65D 51/16* | (2006.01) |
| *B65D 43/02* | (2006.01) |
| *B65D 43/18* | (2006.01) |
| *A47J 41/00* | (2006.01) |
| *A47G 19/22* | (2006.01) |
| *B65D 43/26* | (2006.01) |
| *B65D 47/26* | (2006.01) |

(52) U.S. Cl.
CPC ............ *B65D 43/02* (2013.01); *B65D 43/18* (2013.01); *B65D 43/26* (2013.01); *B65D 47/249* (2013.01); *B65D 47/266* (2013.01); *B65D 47/32* (2013.01); *B65D 50/061* (2013.01); *B65D 51/1683* (2013.01); *B65D 51/18* (2013.01); *B65D 2205/02* (2013.01); *B65D 2251/009* (2013.01); *B65D 2251/0018* (2013.01); *B65D 2251/0028* (2013.01); *B65D 2251/0081* (2013.01); *B65D 2543/00046* (2013.01)

(58) Field of Classification Search
USPC ........... 220/715; 222/153.11, 153.14, 153.13
See application file for complete search history.

(56) References Cited

U.S. PATENT DOCUMENTS

| | | |
|---|---|---|
| 421,282 A | 2/1890 | Jackson |
| 599,389 A | 2/1898 | Jackson |
| 656,000 A | 8/1900 | Wall |
| 657,636 A | 9/1900 | Bingham |
| 768,355 A | 8/1904 | Bolen |
| 830,142 A | 9/1906 | Ebbing |
| 1,072,588 A | 9/1913 | Duncan |
| 1,284,728 A | 11/1918 | Wahl et al. |
| 2,138,387 A | 11/1938 | Officer |
| 2,193,232 A | 3/1940 | Hacmac |
| 2,210,206 A | 8/1940 | Fisher |
| 2,274,849 A | 3/1942 | Peterson |
| 2,447,870 A | 8/1948 | Polcyn |
| 2,622,420 A | 12/1952 | Rice |
| 2,799,437 A | 7/1957 | Jepson |
| 2,884,157 A | 4/1959 | Lampkin |
| 3,050,219 A | 8/1962 | Sagarin |
| 3,059,816 A | 10/1962 | Goldstein |
| 3,096,897 A | 7/1963 | Hansen |
| 3,185,350 A | 5/1965 | Abplanalp |
| 3,325,054 A | 6/1967 | Braun |
| D209,483 S | 12/1967 | Frank |
| 3,422,996 A | 1/1969 | Lipman |
| 3,591,128 A | 7/1971 | Ramis |
| 3,635,380 A | 1/1972 | Fitzgerald |
| 3,722,748 A | 3/1973 | Wakeman et al. |
| 3,739,938 A | 6/1973 | Paz |
| 3,744,682 A | 7/1973 | Blank |
| 3,770,167 A | 11/1973 | Ewald |
| 3,964,631 A | 6/1976 | Albert |
| 3,967,748 A | 7/1976 | Albert |
| 3,972,443 A | 8/1976 | Albert |
| 4,057,167 A | 11/1977 | Lee |
| 4,065,036 A | 12/1977 | Kirk, Jr. |
| 4,094,433 A | 6/1978 | Numbers |
| 4,099,642 A | 7/1978 | Nergard |
| 4,127,221 A | 11/1978 | Vere |
| 4,133,446 A | 1/1979 | Albert |
| 4,136,799 A | 1/1979 | Albert |
| 4,171,060 A | 10/1979 | Howard et al. |
| 4,212,408 A | 7/1980 | Valenzona |
| 4,276,992 A | 7/1981 | Susich |
| 4,303,173 A | 12/1981 | Nergard |
| D274,984 S | 8/1984 | Thornell |
| D288,667 S | 3/1987 | Miner |
| 4,676,411 A | 6/1987 | Simasaki |
| D291,537 S | 8/1987 | Crawford et al. |
| 4,711,372 A | 12/1987 | Gach |
| 4,712,704 A | 12/1987 | Ramsey et al. |
| 4,779,766 A | 10/1988 | Kinsley |
| 4,801,053 A | 1/1989 | Kaster |
| 4,834,270 A | 5/1989 | Messner |
| 4,852,770 A | 8/1989 | Sledge et al. |
| 4,865,228 A | 9/1989 | Landecker |
| 4,881,668 A | 11/1989 | Kitterman et al. |
| D315,872 S | 4/1991 | Bixler |
| D318,427 S | 7/1991 | Sherburne, Jr. |
| 5,082,134 A | 1/1992 | Ramsey |
| 5,118,014 A | 6/1992 | Hestehave et al. |
| 5,153,977 A | 10/1992 | Toida et al. |
| 5,169,016 A | 12/1992 | Hinz, Jr. |
| 5,186,353 A | 2/1993 | Ramsey |
| 5,199,597 A | 4/1993 | Gladish |
| 5,222,623 A | 6/1993 | Eger et al. |
| 5,244,113 A | 9/1993 | Stymiest |
| 5,249,703 A | 10/1993 | Karp |
| 5,252,278 A | 10/1993 | Spann et al. |
| 5,307,950 A | 5/1994 | Li |
| 5,412,821 A | 5/1995 | Wilkinson |
| 5,427,271 A | 6/1995 | Wang |
| 5,462,185 A | 10/1995 | Walker, III |
| 5,465,866 A | 11/1995 | Belcastro |
| 5,477,980 A | 12/1995 | Chaffin |
| 5,485,938 A | 1/1996 | Boersma |
| D367,611 S | 3/1996 | Wagner, III et al. |
| 5,495,966 A | 3/1996 | Won |
| D373,927 S | 9/1996 | Kramer et al. |
| D375,019 S | 10/1996 | Goto et al. |
| 5,570,797 A | 11/1996 | Yeh |
| 5,573,139 A | 11/1996 | Yeh |
| 5,580,504 A | 12/1996 | Spann et al. |
| 5,615,808 A | 4/1997 | Huang |
| 5,652,985 A | 8/1997 | Wilkinson et al. |
| 5,680,951 A | 10/1997 | Feltman, III et al. |
| D386,948 S | 12/1997 | Wissinger |
| 5,711,452 A | 1/1998 | Chaffin |
| D392,888 S | 3/1998 | Bakic |
| 5,753,289 A | 5/1998 | Ness |
| D394,778 S | 6/1998 | Arns et al. |
| D397,905 S | 9/1998 | Hsu |
| D404,613 S | 1/1999 | Hatsumoto et al. |
| D405,011 S | 2/1999 | DeCoster et al. |
| D406,006 S | 2/1999 | Hatsumoto et al. |
| D407,313 S | 3/1999 | Wadsworth et al. |
| D408,221 S | 4/1999 | Asberg |
| 5,918,854 A | 7/1999 | Barrash et al. |
| 5,944,235 A | 8/1999 | Won |
| D416,755 S | 11/1999 | Trombly |
| D417,360 S | 12/1999 | Bickert et al. |
| 6,003,711 A | 12/1999 | Bilewitz |
| 6,010,029 A | 1/2000 | Wang |
| 6,036,271 A | 3/2000 | Wilkinson et al. |
| 6,053,474 A | 4/2000 | Stucke, Jr. et al. |
| 6,098,834 A | 8/2000 | Hatsumoto et al. |
| 6,102,244 A | 8/2000 | Kuwano et al. |
| 6,116,476 A | 9/2000 | Huang |
| 6,126,035 A | 10/2000 | Schaper et al. |
| 6,158,608 A | 12/2000 | Schlattl |
| RE37,016 E | 1/2001 | Morano |
| D437,229 S | 2/2001 | Andrew |
| 6,276,560 B1 | 8/2001 | Belcastro |
| D447,693 S | 9/2001 | Warner et al. |
| 6,351,863 B1 | 3/2002 | Meyer et al. |

(56) References Cited

U.S. PATENT DOCUMENTS

| | | |
|---|---|---|
| 6,352,166 B1 | 3/2002 | Copeland |
| 6,401,990 B1 | 6/2002 | Walters et al. |
| D460,894 S | 7/2002 | Ziegenfus et al. |
| 6,443,325 B1 | 9/2002 | Schaper et al. |
| 6,471,085 B1 | 10/2002 | Gallo |
| D470,009 S | 2/2003 | Turchi et al. |
| D471,808 S | 3/2003 | de Castro Couto |
| 6,557,717 B1 | 5/2003 | Keck |
| D476,230 S | 6/2003 | Braaten et al. |
| 6,601,735 B2 | 8/2003 | Milian et al. |
| 6,626,314 B1 | 9/2003 | McHenry et al. |
| D480,268 S | 10/2003 | Laib |
| 6,644,490 B2 | 11/2003 | Clarke |
| 6,679,397 B2 | 1/2004 | Smith et al. |
| 6,695,171 B2 | 2/2004 | Walters et al. |
| 6,702,137 B1 | 3/2004 | Kowa et al. |
| D489,257 S | 5/2004 | Braaten et al. |
| 6,732,875 B2 | 5/2004 | Smith et al. |
| 6,732,876 B2 | 5/2004 | Belcastro |
| 6,763,964 B1 | 7/2004 | Hurlbut et al. |
| 6,824,003 B1 | 11/2004 | Wong |
| D500,428 S | 1/2005 | Ward et al. |
| 6,854,615 B2 | 2/2005 | von Ronn et al. |
| D502,844 S | 3/2005 | Rohe |
| D508,185 S | 8/2005 | Gauss |
| 6,935,536 B2 | 8/2005 | Tardif |
| 6,976,281 B2 | 12/2005 | Schunk et al. |
| 6,978,910 B2 | 12/2005 | Sanders et al. |
| D513,452 S | 1/2006 | Parve |
| 7,011,227 B2 | 3/2006 | Ward et al. |
| D522,794 S | 6/2006 | Imai |
| D523,340 S | 6/2006 | Westphal |
| 7,073,678 B1 | 7/2006 | Dibdin et al. |
| D526,898 S | 8/2006 | Isono et al. |
| D526,899 S | 8/2006 | Mangin et al. |
| D529,379 S | 10/2006 | Mengeu et al. |
| D529,761 S | 10/2006 | Trombly |
| D532,300 S | 11/2006 | Moretti |
| D533,064 S | 12/2006 | Glynn et al. |
| 7,195,137 B2 | 3/2007 | Belcastro |
| D540,625 S | 4/2007 | Sandberg |
| 7,201,288 B2 | 4/2007 | von Ronn et al. |
| D541,572 S | 5/2007 | Watanabe |
| D544,300 S | 6/2007 | Tien |
| D547,122 S | 7/2007 | Gluck |
| D547,611 S | 7/2007 | Seum et al. |
| D548,008 S | 8/2007 | Lin |
| D548,508 S | 8/2007 | Tonelli |
| D552,990 S | 10/2007 | Vogel |
| 7,275,653 B2 | 10/2007 | Tedford, Jr. |
| D554,433 S | 11/2007 | Gluck |
| D554,992 S | 11/2007 | Mangin et al. |
| D555,000 S | 11/2007 | Bunce et al. |
| D555,514 S | 11/2007 | Munn |
| D555,970 S | 11/2007 | Schreitmueller et al. |
| D558,111 S | 12/2007 | Banks, III |
| D560,435 S | 1/2008 | Meehan |
| D564,840 S | 3/2008 | Williams |
| D564,841 S | 3/2008 | Clemens et al. |
| D564,874 S | 3/2008 | Mangin et al. |
| D569,182 S | 5/2008 | Homma |
| D572,531 S | 7/2008 | Romandy et al. |
| D573,017 S | 7/2008 | Henderson |
| D573,404 S | 7/2008 | Wahl |
| 7,413,096 B2 | 8/2008 | Morgan et al. |
| D577,582 S | 9/2008 | Walsh et al. |
| D577,958 S | 10/2008 | Homma |
| D581,279 S | 11/2008 | Oates |
| D581,727 S | 12/2008 | Pinelli et al. |
| D584,107 S | 1/2009 | George |
| D585,698 S | 2/2009 | Trombly |
| D587,060 S | 2/2009 | Tong Chi Chung |
| D587,969 S | 3/2009 | Gilbert |
| D588,411 S | 3/2009 | Watanabe |
| D589,750 S | 4/2009 | Liu et al. |
| 7,513,380 B2 | 4/2009 | Canedo |
| D592,012 S | 5/2009 | Carreno |
| D592,456 S | 5/2009 | Pinelli et al. |
| D592,505 S | 5/2009 | Mobley et al. |
| D592,905 S | 5/2009 | Pinelli et al. |
| D592,913 S | 5/2009 | Pinelli et al. |
| 7,546,933 B2 | 6/2009 | Pinelli |
| D603,704 S | 11/2009 | Jost et al. |
| 7,611,029 B2 | 11/2009 | Wong |
| D606,364 S | 12/2009 | Gilbert et al. |
| D609,054 S | 2/2010 | Gilbert |
| D610,874 S | 3/2010 | Gilbert et al. |
| D611,764 S | 3/2010 | Wahl et al. |
| D613,160 S | 4/2010 | Ablo |
| D623,473 S | 9/2010 | Chen |
| D623,474 S | 9/2010 | Carlson et al. |
| D623,476 S | 9/2010 | Carlson et al. |
| D625,146 S | 10/2010 | George et al. |
| D629,653 S | 12/2010 | Gullickson et al. |
| D634,161 S | 3/2011 | Roth et al. |
| RE42,484 E | 6/2011 | Kitamura et al. |
| D640,094 S | 6/2011 | Carlson et al. |
| D643,245 S | 8/2011 | Minarsch |
| 7,997,442 B2 | 8/2011 | Pinelli |
| D648,985 S | 11/2011 | Chiu et al. |
| 8,056,745 B2 | 11/2011 | Yu |
| D656,787 S | 4/2012 | Phillips et al. |
| D658,443 S | 5/2012 | Chiu et al. |
| D659,473 S | 5/2012 | Ghiassi |
| D662,360 S | 6/2012 | George |
| 8,297,462 B1 | 10/2012 | Joyce |
| 8,360,258 B2 | 1/2013 | Gilbert et al. |
| 8,360,267 B1 | 1/2013 | Chiou et al. |
| D675,873 S | 2/2013 | Miller et al. |
| D676,278 S | 2/2013 | Wong |
| 8,376,162 B2 | 2/2013 | Yang |
| 8,403,173 B2 | 3/2013 | Wahl et al. |
| 8,418,992 B2 | 4/2013 | Meyer et al. |
| 8,459,510 B2 | 6/2013 | Richards et al. |
| 8,464,895 B2 | 6/2013 | Gilbert et al. |
| D686,074 S | 7/2013 | Brinckerhoff et al. |
| 8,573,431 B2 | 11/2013 | Shepard et al. |
| 8,622,229 B2 | 1/2014 | Lane |
| D700,807 S | 3/2014 | Kershaw et al. |
| 8,727,176 B2 | 5/2014 | El-Saden et al. |
| 8,844,762 B2 | 9/2014 | Chiou et al. |
| 8,863,979 B2 | 10/2014 | El-Saden et al. |
| D721,250 S | 1/2015 | Chen et al. |
| 8,978,923 B2 | 3/2015 | George |
| D732,892 S | 6/2015 | Keys et al. |
| 9,113,698 B2 | 8/2015 | Blain et al. |
| 9,375,107 B2 | 6/2016 | Gilbert et al. |
| 9,808,101 B2 | 11/2017 | Chiou et al. |
| 2002/0033400 A1 | 3/2002 | Rohrer et al. |
| 2003/0071041 A1 | 4/2003 | Vogel |
| 2003/0102338 A1 | 6/2003 | Martin |
| 2004/0040962 A1 | 3/2004 | Bielecki et al. |
| 2004/0217139 A1 | 11/2004 | Roth et al. |
| 2005/0029265 A1 | 2/2005 | Morgan et al. |
| 2006/0043091 A1 | 3/2006 | Pinelli et al. |
| 2006/0081633 A1 | 4/2006 | Schmidtner et al. |
| 2006/0096983 A1 | 5/2006 | Patterson |
| 2006/0113327 A1 | 6/2006 | Walters et al. |
| 2006/0175331 A1 | 8/2006 | Lin et al. |
| 2006/0226160 A1 | 10/2006 | Elsaden et al. |
| 2007/0170184 A1 | 7/2007 | Canedo |
| 2007/0210093 A1 | 9/2007 | Pinelli |
| 2007/0241134 A1 | 10/2007 | Gurrisi et al. |
| 2008/0156817 A1 | 7/2008 | Roseblade et al. |
| 2008/0237233 A1 | 10/2008 | Choi et al. |
| 2008/0272134 A1 | 11/2008 | Rohe |
| 2010/0206835 A1 | 8/2010 | Yu |
| 2011/0132908 A1 | 6/2011 | Meehan |
| 2011/0309095 A1 | 12/2011 | Pinelli |
| 2012/0285961 A1 | 11/2012 | Roth et al. |
| 2013/0119060 A1 | 5/2013 | Chiou et al. |
| 2013/0140309 A1 | 6/2013 | George |
| 2014/0197170 A1 | 7/2014 | Carlile et al. |
| 2016/0198878 A1 | 7/2016 | Gilbert et al. |

(56) References Cited

U.S. PATENT DOCUMENTS

| | | |
|---|---|---|
| 2016/0264308 A1 | 9/2016 | Gilbert et al. |
| 2016/0264309 A1 | 9/2016 | Gilbert et al. |
| 2016/0264310 A1 | 9/2016 | Gilbert et al. |
| 2016/0264311 A1 | 9/2016 | Gilbert et al. |
| 2017/0101231 A1 | 4/2017 | George |

FOREIGN PATENT DOCUMENTS

| | | |
|---|---|---|
| CN | 1245766 A | 3/2000 |
| CN | 1299317 A | 6/2001 |
| CN | 1345682 A | 4/2002 |
| CN | 1432512 A | 7/2003 |
| CN | 1636835 A | 7/2005 |
| CN | 2866364 Y | 2/2007 |
| DE | 3402894 A1 | 8/1985 |
| DE | 20003371 U1 | 4/2000 |
| DE | 202011002273 U1 | 4/2011 |
| EP | 1182147 A2 | 2/2002 |
| JP | S55027429 A | 2/1980 |
| JP | S58043329 A | 3/1983 |
| JP | S62131622 U | 8/1987 |
| JP | H9150852 A | 6/1997 |
| JP | H11001258 A | 1/1999 |
| JP | 2005193944 A | 7/2005 |
| JP | 2005278855 A | 10/2005 |
| JP | 2009279332 A | 12/2009 |
| JP | 3171259 U | 10/2011 |
| KR | 2019980061202 | 11/1998 |
| WO | 0034143 A1 | 6/2000 |
| WO | 2000045684 A1 | 8/2000 |
| WO | 2005115204 A1 | 12/2005 |
| WO | 2010085367 A1 | 7/2010 |

OTHER PUBLICATIONS

Extended European Search Report dated Mar. 18, 2013, European Patent Application No. 12195654.4, filed Dec. 5, 2012, seven pages.

Extended European Search Report dated Oct. 18, 2012, European Patent Application No. 12173632.6, four pages.

International Preliminary Report on Patentability for related International Application No. PCT/US2012/064801, dated May 20, 2014.

International Search Report and Written Opinion dated May 21, 2012, International Patent Application No. PCT/US2011/060042, 13 pages.

BEVERAGE CONTAINER CLOSURE

BACKGROUND OF THE INVENTION

Field of the Invention

The present invention is directed generally to lids for liquid storage vessels such as for beverage or food containers and more particularly to lids with movable components.

Description of the Related Art

Prior art lids are typically of one of three types. The first type is a solid unitary lid that does not include openings or apertures through which the contents of a liquid storage vessel may exit the vessel. To drink from the vessel, a user must remove the lid. The second type, which may also be of a unitary construction, includes one or more unobstructed apertures through which the liquid may exit the vessel. In the second type, the apertures are always open. If the vessel is inadvertently tipped or dropped, the contents of the vessel may spill. The third type of lid includes one or more apertures through which the liquid may exit the vessel and a means for selectively opening and closing the apertures. When using the third type of lid, the user may selectively open the apertures to remove the contents from the vessel and selectively close the apertures to maintain the contents inside the vessel. Further, by closing the apertures, the lid may help insulate the contents from the environment outside the vessel.

DETAILED DESCRIPTION OF THE INVENTION

Figure 1:
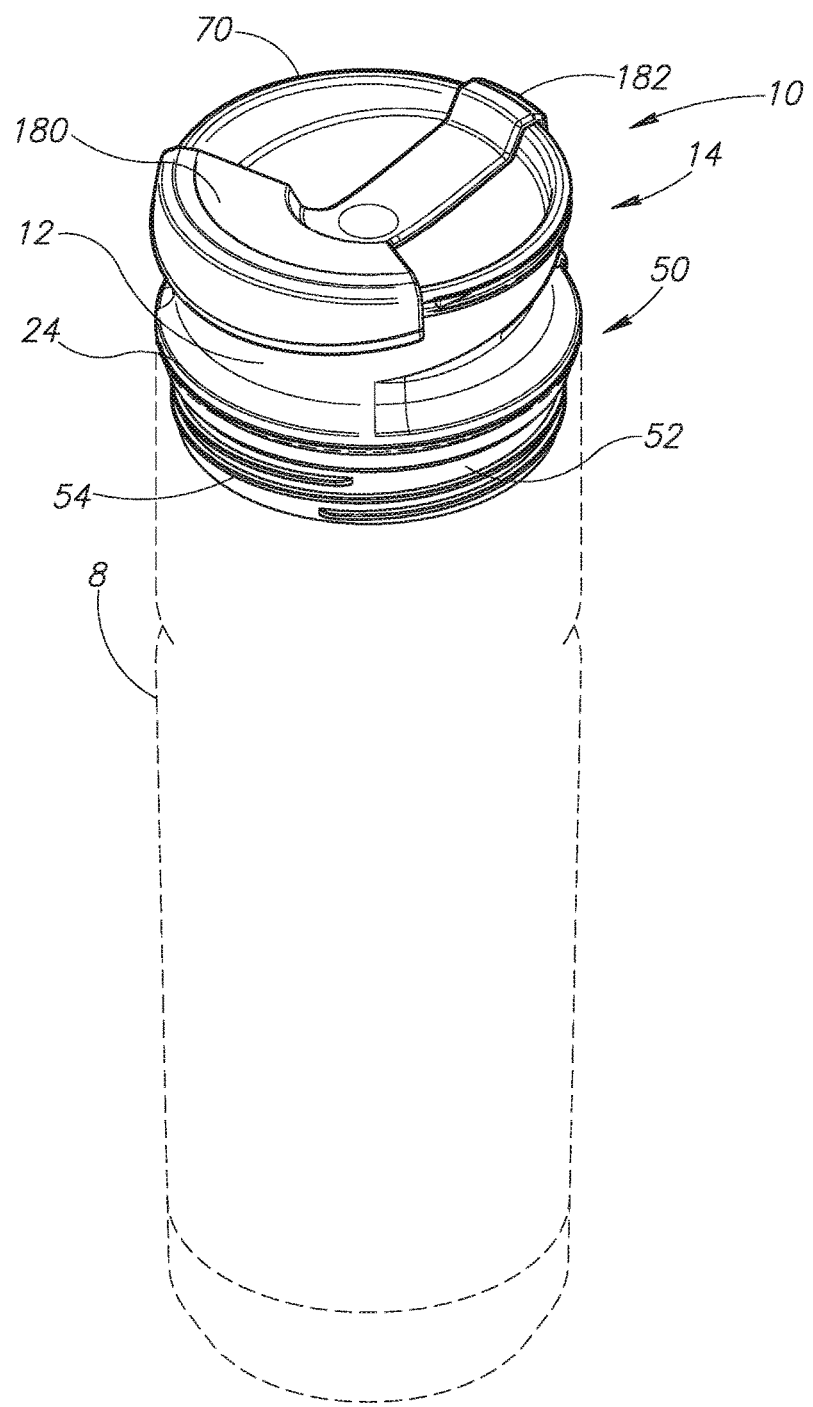
FIG. 1 is a top left side perspective view of a beverage container closure constructed in accordance with the present invention.
Figure 2:
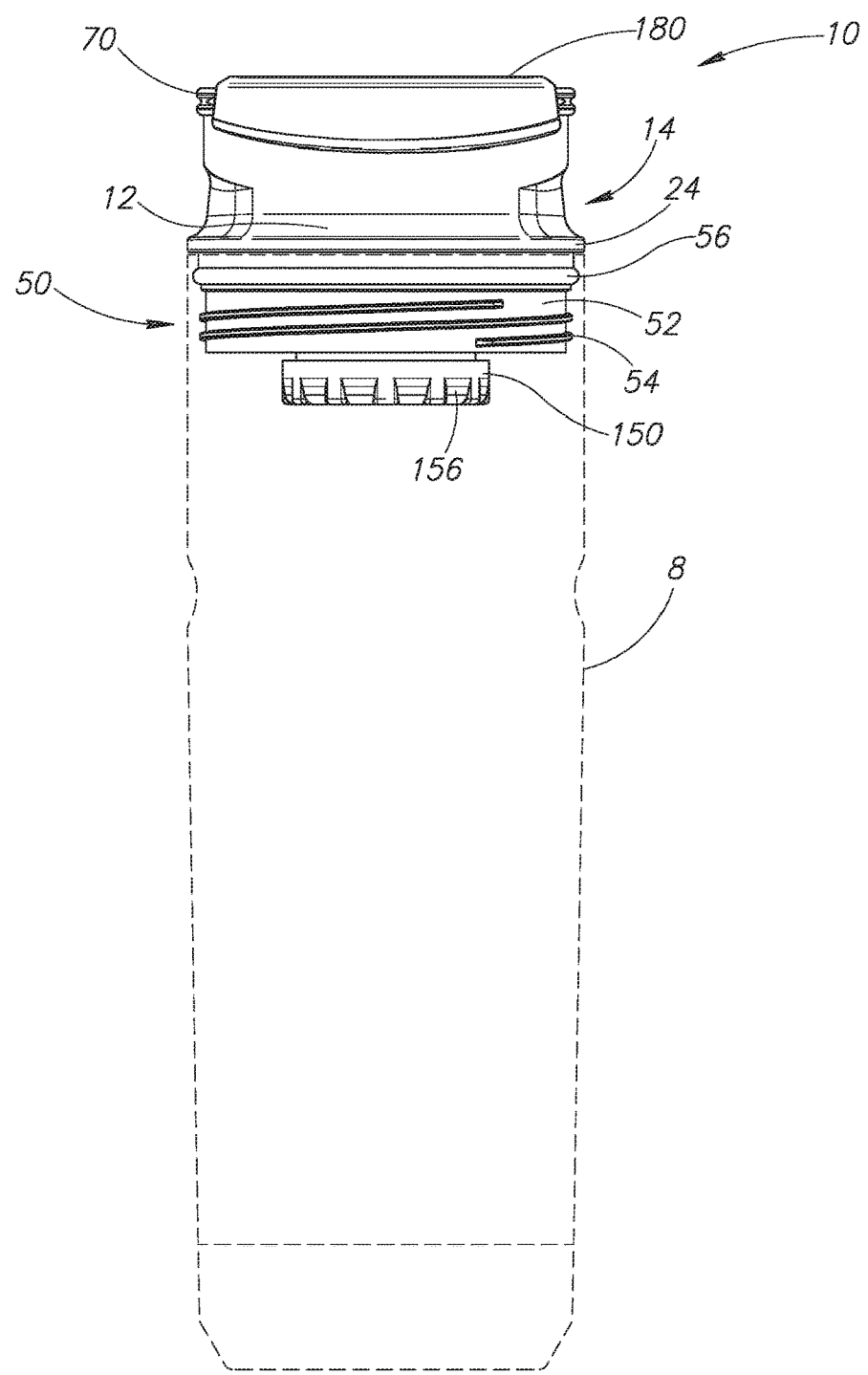
FIG. 2 is a front elevational view of the beverage container closure of FIG. 1.

A beverage container closure or lid, in accordance with an embodiment of the present invention, is generally indicated by reference numeral 10 in FIG. 1. The lid 10 has a generally cylindrical main body 12 that is adapted for closing an open end of a conventional drinking vessel or beverage container 8 (shown in dashed lines). The beverage container 8 may be any suitable type of container such as the tumbler type (that is, without a handle) for use in automotive beverage receptacles, or for transport in backpacks, book bags, and the like. The lid 10 is selectively couplable to the beverage container 8 by any suitable means such as threads 54 disposed on an outer surface of a sidewall 52 of a lower, downwardly depending portion 50 of the main body 12. The lid 10 also includes a flexible o-ring seal member 56 (see FIG. 2) positioned adjacent the sidewall 52 of the lower portion 50 at a location near a bottom surface of an upper portion 14 of the main body 12. The particular configuration for mating the lid 10 to the container 8 is a matter of choice for one of ordinary skill in the art. Thus, although threads 54 and the seal member 56 have been shown in this embodiment, those of ordinary skill in the art will appreciate that any other means for attaching and sealing the lid 10 with respect to the beverage container 8 may be substituted.

Figure 8:
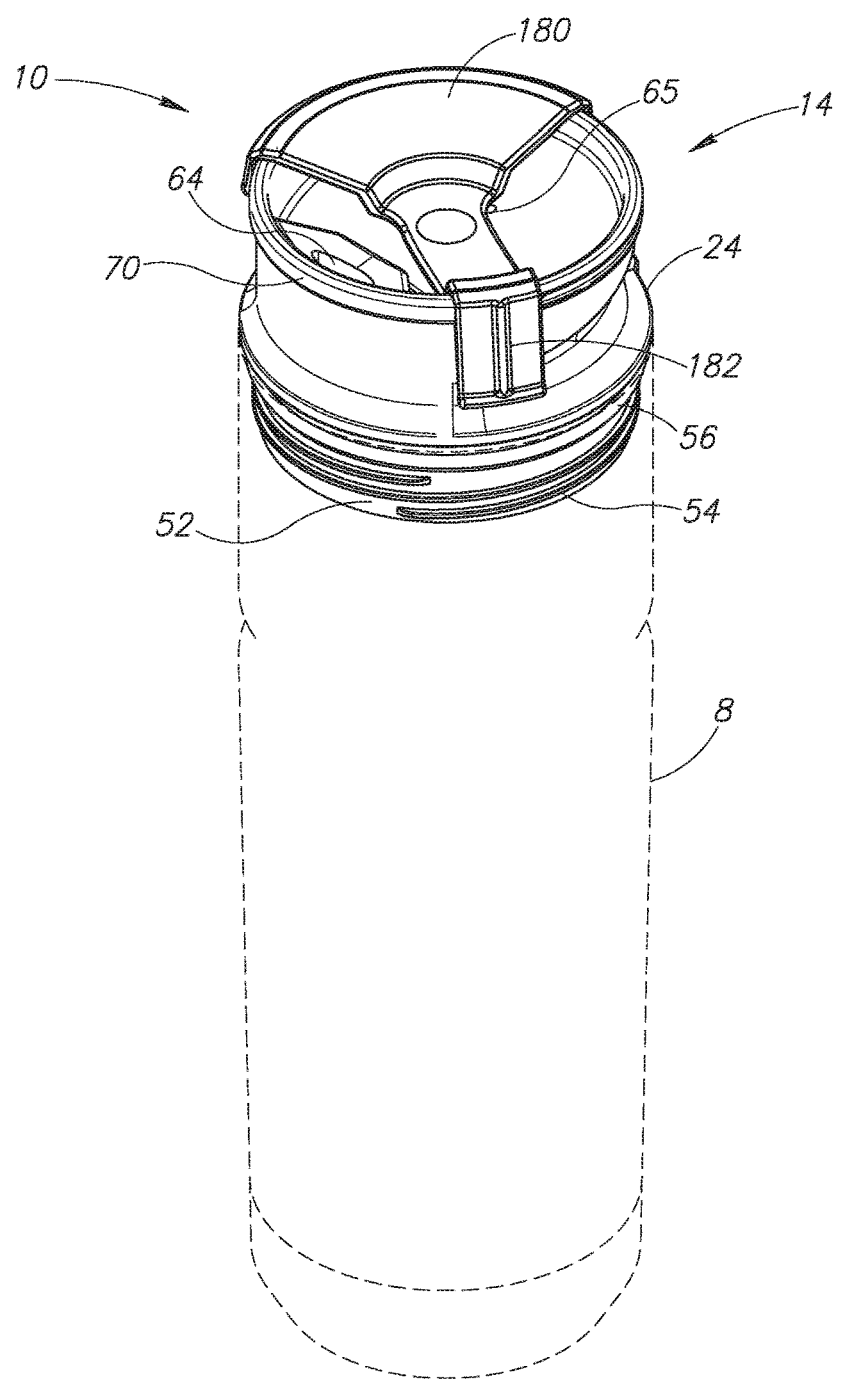
FIG. 8 is a top left side perspective view of the beverage container closure of FIG. 1, with a dust cover rotated away from the opening in the beverage container closure to provide a user with access to the opening.
Figure 11A:
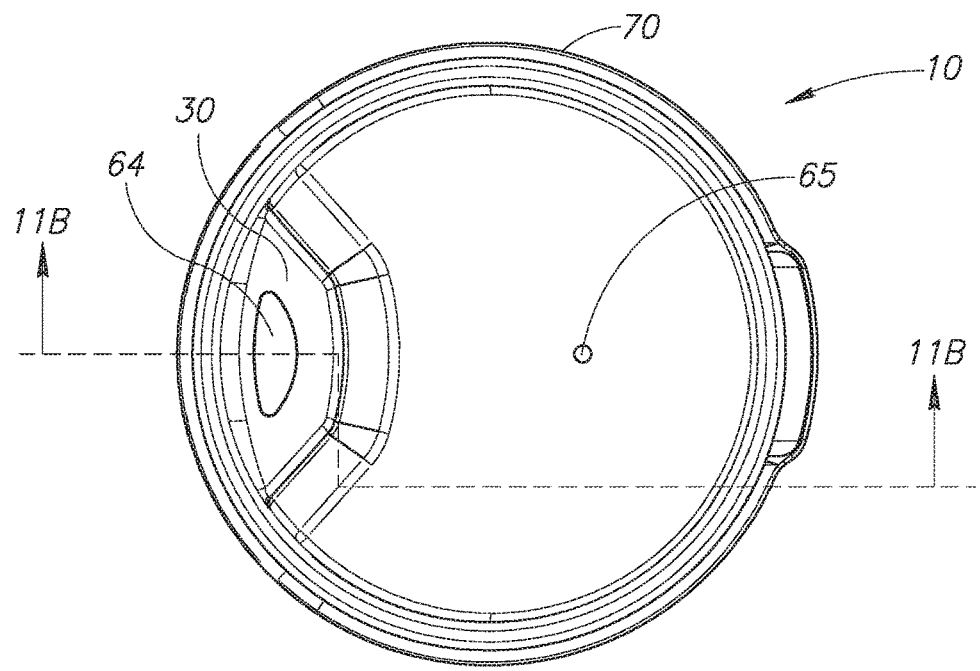
FIG. 11A is a top plan view of the beverage container closure of FIG. 1 with the dust cover removed.

As best seen in FIG. 8, the upper portion 14 of the main body 12 also includes a top rim portion 70 configured for contact with a user's lips when the entire assembly is tipped toward the user, such that the user may drink from the beverage container 8 to which the lid 10 is attached. The upper portion 14 also includes an aperture or opening 64 configured to permit fluid passage therethrough when a user drinks a beverage. The upper portion further includes an air vent 65 (see FIG. 11A) that allows liquid to flow more freely out of the beverage container 8 when a user drinks therefrom.

Figure 13:
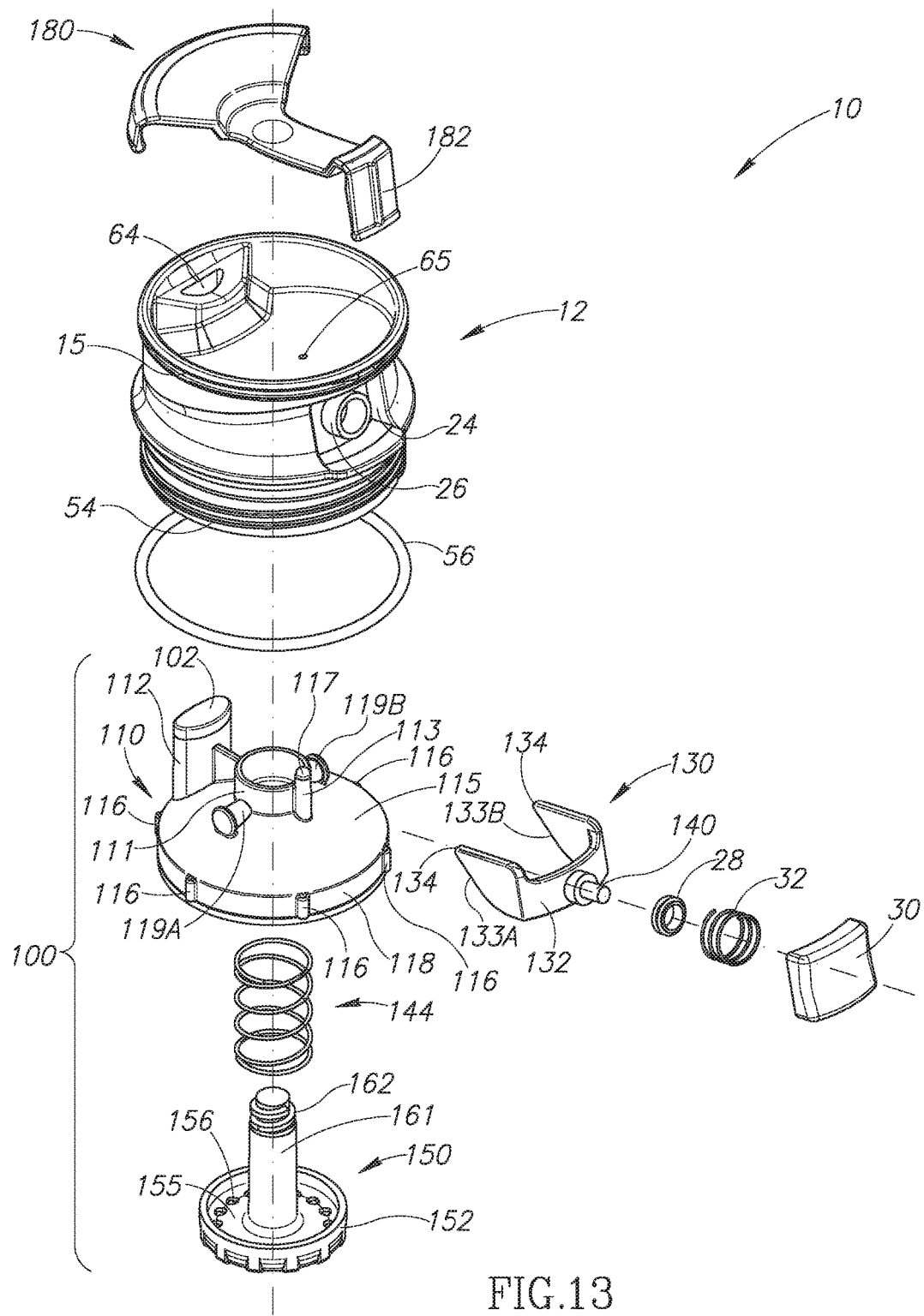
FIG. 13 is an exploded perspective view of a stopper assembly of the beverage container closure of FIG. 1.

Fluid communication between the upper portion 14 and the interior of the beverage container 8 is controlled by way of a selectively openable stopper assembly 100, which may best be viewed in FIG. 13. The stopper assembly 100 includes a stopper 110 having a first raised portion 112 configured for attachment of a stopper seal 102 thereto (e.g., by a press fit). The stopper seal 102 may be formed from a flexible material and is shaped to be positioned over a top surface 114 (see FIG. 10) of the first raised portion 112. The stopper 110 also includes a second raised portion 113 configured for attachment of a vent seal 117 thereto (e.g., by a press fit). Below the raised portions 112 and 113 of the stopper 110 is an angled base or body portion 115. Further, extending in a downward direction from the body portion 115 of the stopper 110 is a circumferential sidewall 118 that includes a circumferential groove 120 (see FIG. 10) disposed on its inner surface. As discussed in further detail below, the sidewall 118 and the groove 120 are configured to engage a ridge 172 of a stopper cap 170 via a press fit. The body portion 115 and stopper cap 170 of the stopper 110 form a fluid flow barrier portion of the stopper spanning across the hollow interior body region 36 of the main body 12 of the lid 10 with an outer edge of the barrier portion located immediately adjacent to the main body sidewall 52.

Figure 7:
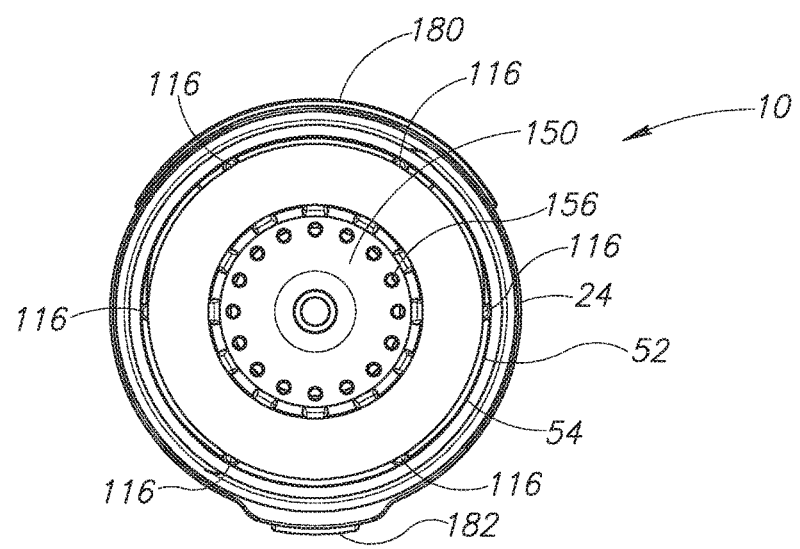
FIG. 7 is a bottom plan view of the beverage container closure of FIG. 1.
Figure 10:
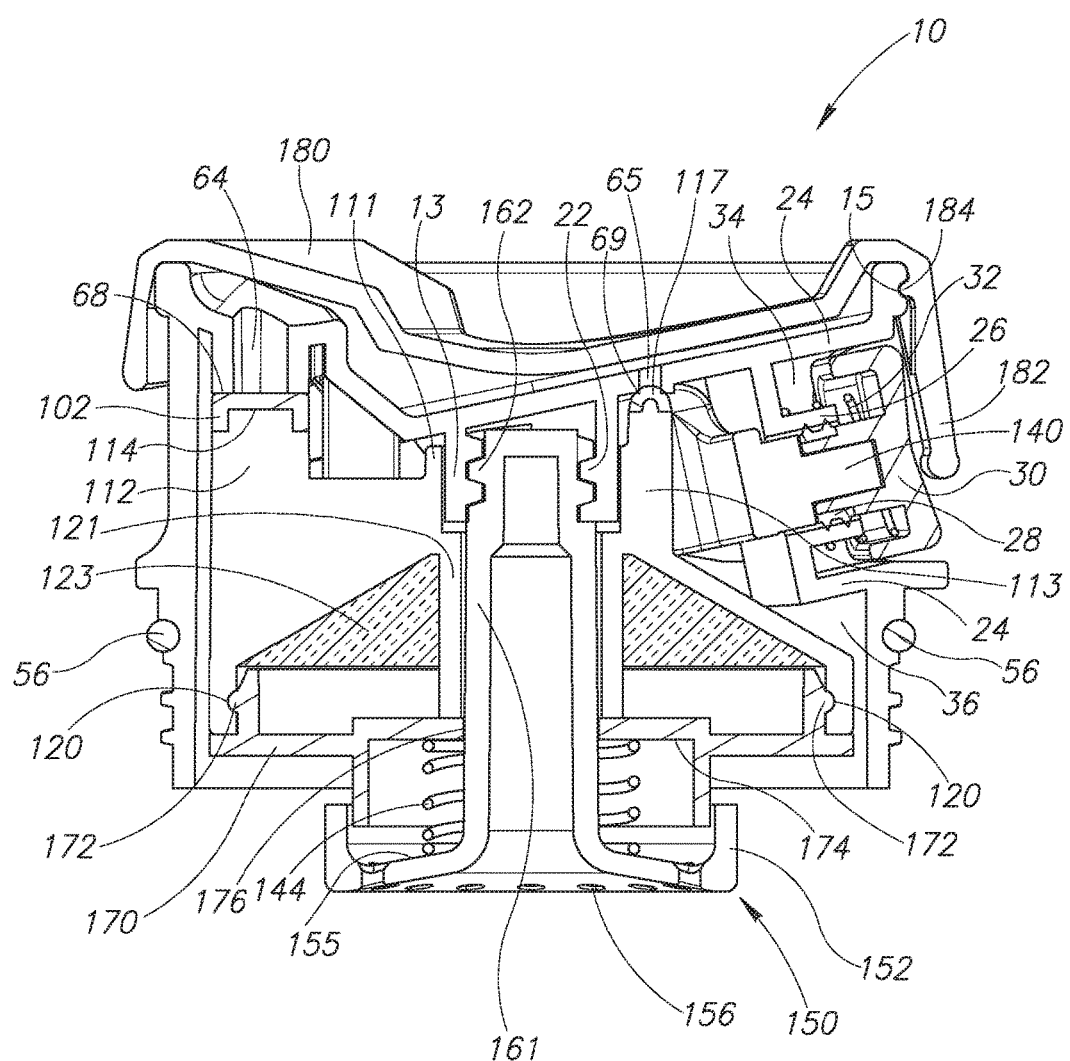
FIG. 10 is a cross-sectional left side elevational view of the beverage container closure of FIG. 1 with a stopper of the beverage container closure in the closed position.
Figure 11B:
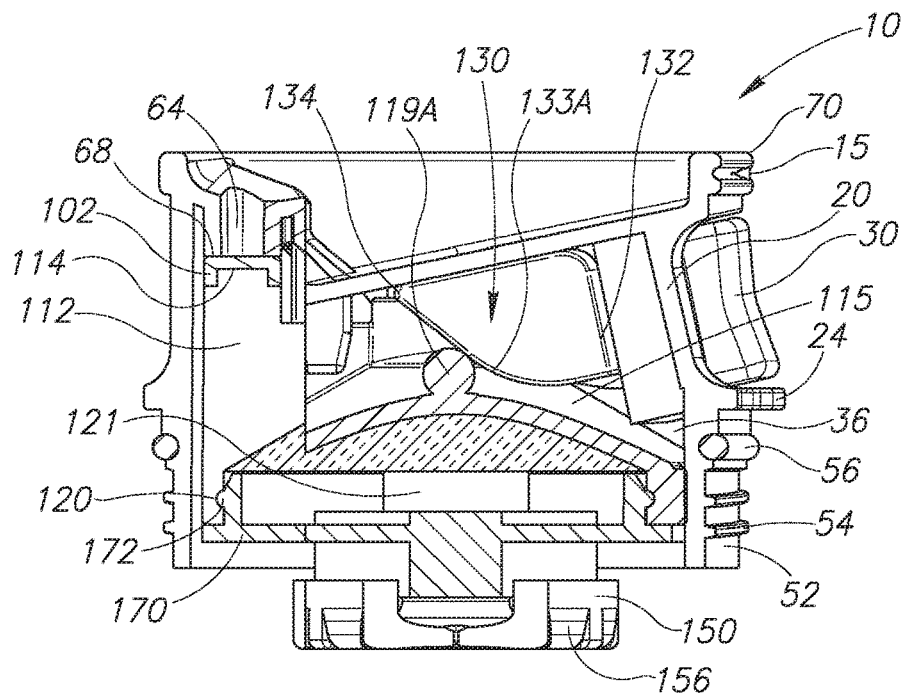
FIG. 11B is a sectional view taken substantially along the line 11B-11B of FIG. 11A with the stopper in the closed position.
Figure 12A:
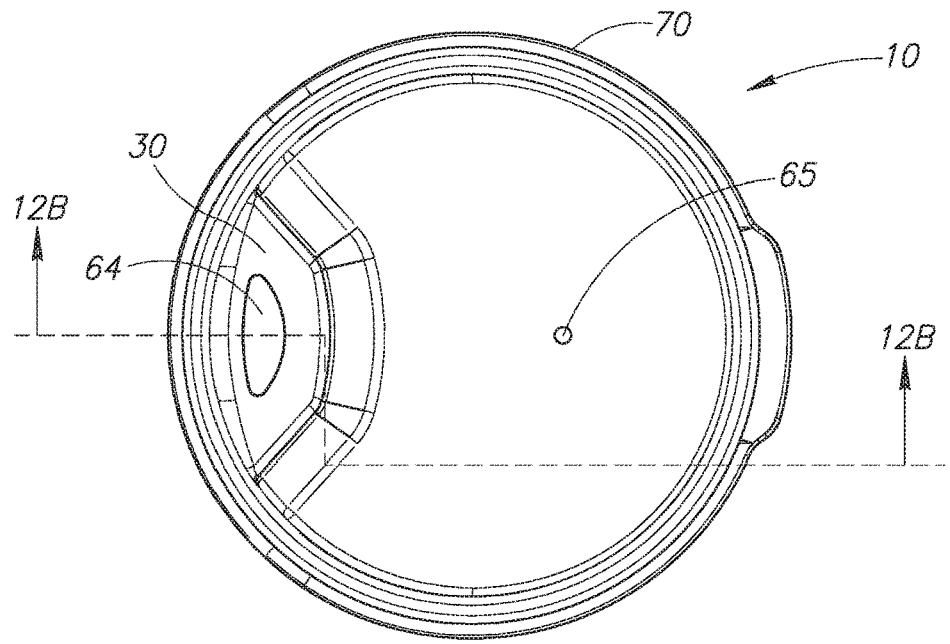
FIG. 12A is a top plan view of the beverage container closure of FIG. 1 with the dust cover removed.
Figure 12B:
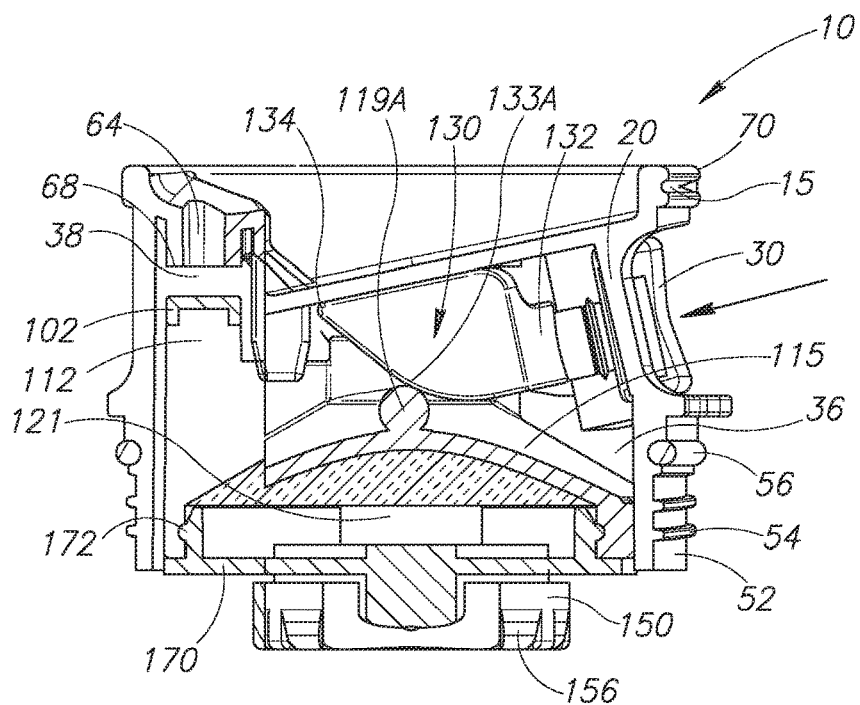
FIG. 12B is a sectional view taken substantially along the line 12B-12B of FIG. 12A with the stopper in the opened position.

As best seen in FIGS. 10, 11B and 12B, the barrier portion outer edge is spaced inward of the main body sidewall 52 to form a perimeter fluid flow pathway located outward of the barrier portion outer edge and adjacent to the main body sidewall during the entire travel of the stopper between the opened position and the closed position. As described below, a stopper sidewall 118 extends downwardly from the body portion 115 of the stopper 110 and forms a downwardly extending perimeter sidewall along the outer perimeter of the barrier portion. As best seen in FIGS. 7 and 13, a plurality of vertically extending and laterally projecting spacer portions 116 are located on the stopper sidewall 118 which forms the perimeter of the barrier portion and spaces the perimeter apart from the main body sidewall 52.

The stopper 110 also comprises an upwardly extending cylindrical wall 111 (see FIGS. 10 and 13) sized to be slightly larger than a downwardly extending cylindrical wall 13 of the upper portion 14 of the main body 12, such that the walls 13 and 111 may move axially freely in telescoping fashion with respect to each other when the lid 10 is operated by a user as described below. The stopper 110 also includes a pair of spaced apart cam follower surfaces 119A and 1196 (or "cam followers") disposed on the base portion 115 of the stopper on opposing sides of the upwardly extending cylindrical wall 111. The functionality of the cam followers 119A and 119B are described herein below.

As may best be viewed in FIG. 10, the stopper cap 170 includes a circumferential ridge 172 for engagement (e.g., a snap fit) with the groove 120 of the stopper 110. The stopper cap 170 further includes an opening defined by an annular-shaped edge 176, and a bottom surface 174. These features are described below. When the stopper cap 170 is coupled to the stopper 110, an interior hollow region 123 is formed. To provide insulation between the interior of the beverage container 8 and the environment, an insulating substance, such as a ring of styrene, may be placed within the interior hollow region 123 of the stopper 110.

The stopper assembly 100 also includes a stopper cover 150 (see FIG. 10) configured for retaining the stopper assembly within a hollow interior region 36 of the main body 12. The stopper cover 150 includes a base portion 152 including a plurality of spaced apart apertures or openings 156 disposed therein to allow for fluid passage therethrough. Further, the stopper cover 150 comprises an upwardly extending substantially cylindrically-shaped rod 161 terminating with an engagement portion 162 with external threads. As shown, the rod 161 passes through the opening defined by the annular-shaped edge 176 in the stopper cap 170, and through a downwardly extending cylindrical wall 121 of the stopper 110, where it is threadably engaged with a stopper cover engagement portion 22 (with internal threads) of the downwardly extending cylindrical wall 13 of the upper portion 14 of the main body 12, thereby securing the stopper cover 150 (and the other components of the stopper assembly 100) to the main body 12 of the lid 10.

As may best be viewed in FIG. 10, the stopper assembly 100 further includes a stopper biasing member (in the illustrated embodiment, a spring) 144 configured for biasing the stopper 110 into the closed position which provides a fluid-tight seal for the lid 10. The stopper biasing member 144 is sized to have a diameter that is slightly larger than the upwardly extending substantially cylindrically-shaped rod 161 of the stopper cover 150, such that the stopper biasing member may be positioned over the rod 161 and between a top surface 155 of the base portion 152 of the stopper cover 150 and an inner bottom surface 174 of the stopper cap 170 (see FIG. 10).

As may best be viewed in FIGS. 11B, 12B, and 13, the stopper assembly 100 further includes an actuating member 130 configured for acting on the cam followers 119A and 119B of the stopper 110 to selectively move the stopper between the opened position and the closed position. The actuating member 130 includes first and second cam surfaces 133A and 133B (or "stopper engagement portions") spaced apart from each other and configured for slidable engagement with the first and second cam followers 119A and 119B (or "actuating member engagement portions"), respectively, of the stopper 110. The cam surfaces 133A and 133B are each ramp-shaped and are angled downward from a distal end 134 toward a proximal end 132 of the actuating member 130 (see FIGS. 11B and 12B). As described below, the cam surfaces 133A and 133B engage the cam follower surfaces 119A and 119B, respectively, to move the stopper 110 between the closed and opened positions (shown in FIGS. 11B and 12B, respectively). The actuating member 130 further includes a rod 140 (see FIG. 13) disposed at the proximal end 132 sized and shaped to be inserted (e.g., press fit) into a recessed portion of a button 30 (see FIGS. 10 and 13) configured to permit a user to actuate the actuating member 130 by simply pressing the button inward.

The operation of the stopper assembly 100 is now described with reference to FIGS. 11B and 12B, which show cut-away left side elevational views of the lid 10 when the stopper 110 is in the sealed or closed position (FIG. 11B) and the opened position (FIG. 12B). As can be seen, the stopper assembly 100 is positioned within the hollow interior region 36 of the main body 12. The engagement portion 162 of the stopper cover 150 is engaged with the stopper cover engagement portion 22 of the downwardly extending cylindrical wall 13 of the upper portion 14 disposed in the hollow interior region 36 of the main body 12. For example, the stopper cover 150 may be threadably engaged with the main body 12 to retain the stopper cover and the other components of the stopper assembly 100.

As shown in FIG. 11B, the stopper seal 102 is in contact with the stopper seal engagement portion 68 that defines the opening 64 of the main body 12. In this regard, when the stopper 100 is in the closed position shown in FIG. 11B, the stopper seal 102 and the vent seal 117 (see FIG. 10) are pressed against the stopper seal engagement portion 68 and a vent seal engagement portion 69, respectively, of the main body 12 by the biasing member 144 to provide a fluid-tight seal between the container 8 to which the lid 10 is attached and the environment.

The actuating member 130 is situated such that the first and second cam surfaces 133A and 133B are aligned over and in contact with the first and second cam followers 119A and 119B, respectively, of the stopper 110. The proximal end 132 of the actuating member 130 is situated within an opening in a rear portion 20 (see FIGS. 10 and 13) of the main body 12 formed by a circumferential wall 26. In turn, the button 30 is coupled to the actuating member 130 (e.g., by a press fit) to allow a user to actuate the actuating member by pressing inward on the button. A button biasing member (e.g., a spring) 32 is positioned over the circumferential wall 26 in a space 34 between the wall 26 and a surrounding outer wall 24 forming a recess in the rear portion 20 of the main body 12. The button biasing member 32 is operative to bias the button 30 and the actuating member 130 coupled thereto to the outward position shown in FIG. 11B which corresponds to the closed position of the stopper 110 and tends to bias the actuating member 130 toward that position. Further, a button ring seal member 28 (see FIGS. 10 and 13) may be disposed around a forward stem portion of the button 30 and inward of the circumferential wall 26 to provide a fluid-tight seal therebetween to prevent leakage to the environment.

In operation, a user may depress the button 30 which in turn causes the actuating member 130 to be displaced in an inward, substantially horizontal direction (from the right to the left in the views shown in FIGS. 11B and 12B). As the actuating member 130 is displaced, the first and second cam surfaces 133A and 133B of the actuating member 130 slidably engage the first and second cam follower surfaces 119A and 119B, respectively, of the stopper 110. Since the first and second cam surfaces 133A and 133B each slope downward from the distal end 134 toward the proximal end 132 of the actuating member 130, the first and second cam follower surfaces 119A and 119B (and thus the stopper 110) are moved in a downward direction as the actuating member 130 is displaced inward, as shown in FIG. 12B. As can be appreciated, as the stopper 110 is moved in a downward direction, a gap 38 (see FIG. 12B) is formed between the stopper seal 102 and the stopper seal engagement portion 68 of the main body 12 such that fluid may pass through the opening 64. Further, a gap is also formed simultaneously between the vent seal 65 and the vent seal engagement portion 69 of the main body 12 allowing air to pass through the vent opening 65 such that fluid may pass through the opening 64 more freely. It should be appreciated that although in this embodiment the actuating member 130 includes the cam surfaces 133A and 133B and the stopper 110 includes the cam followers 119A and 119B, in other embodiments the actuating member 130 may include one or more cam followers and the stopper 110 may include one or more corresponding cam surfaces.

Figure 3:
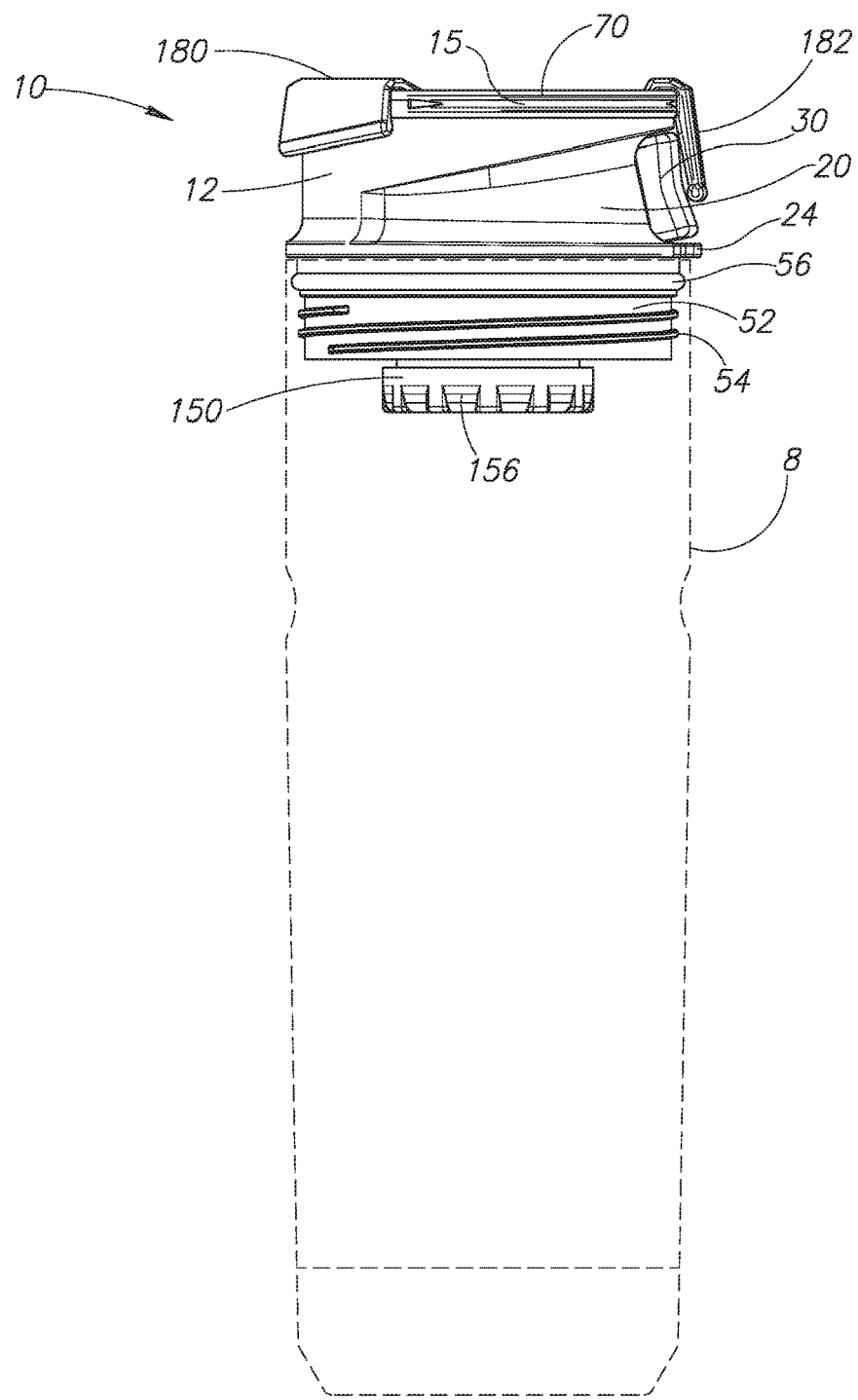
FIG. 3 is a left side elevational view of the beverage container closure of FIG. 1.
Figure 4:
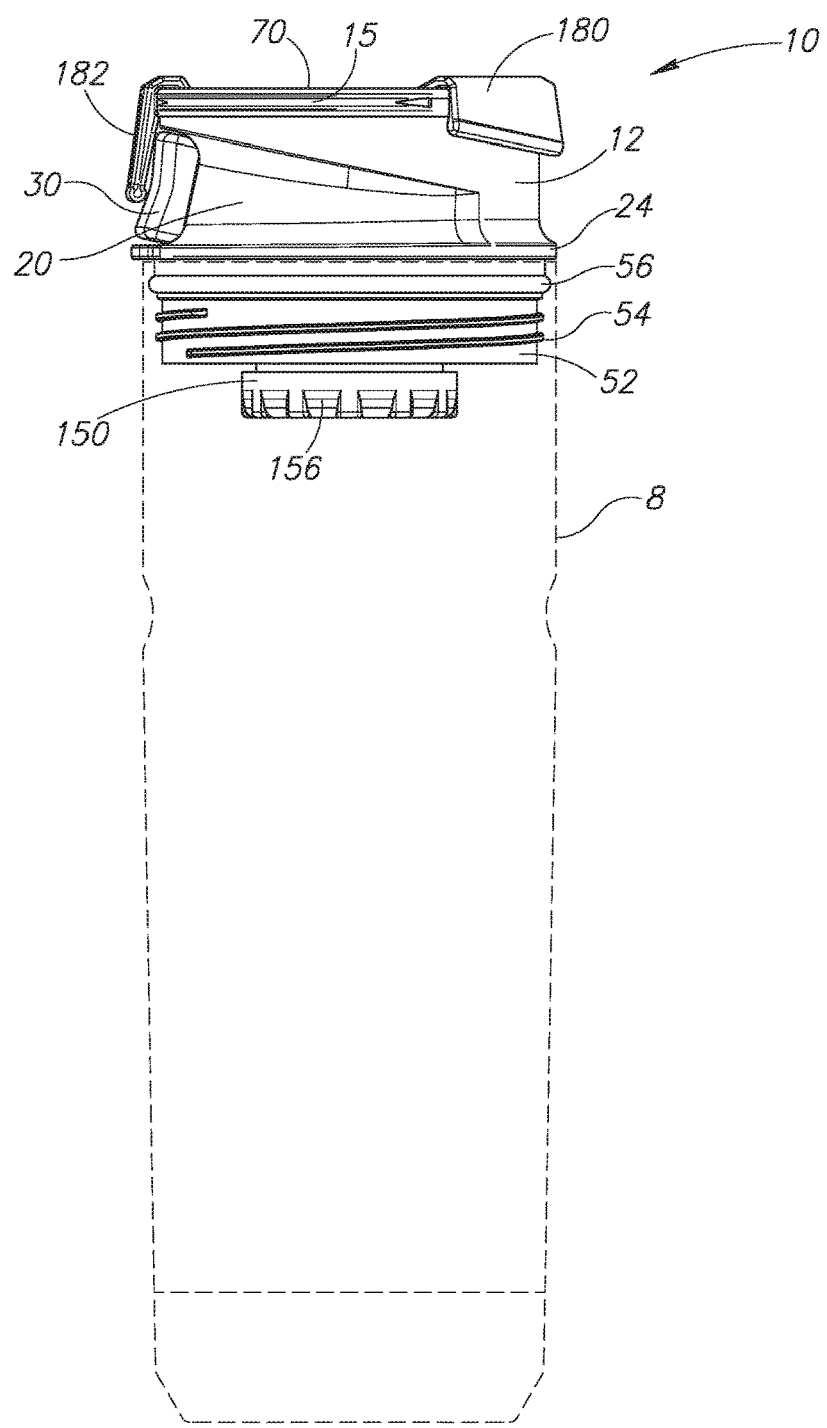
FIG. 4 is a right side elevational view of the beverage container closure of FIG. 1.
Figure 5:
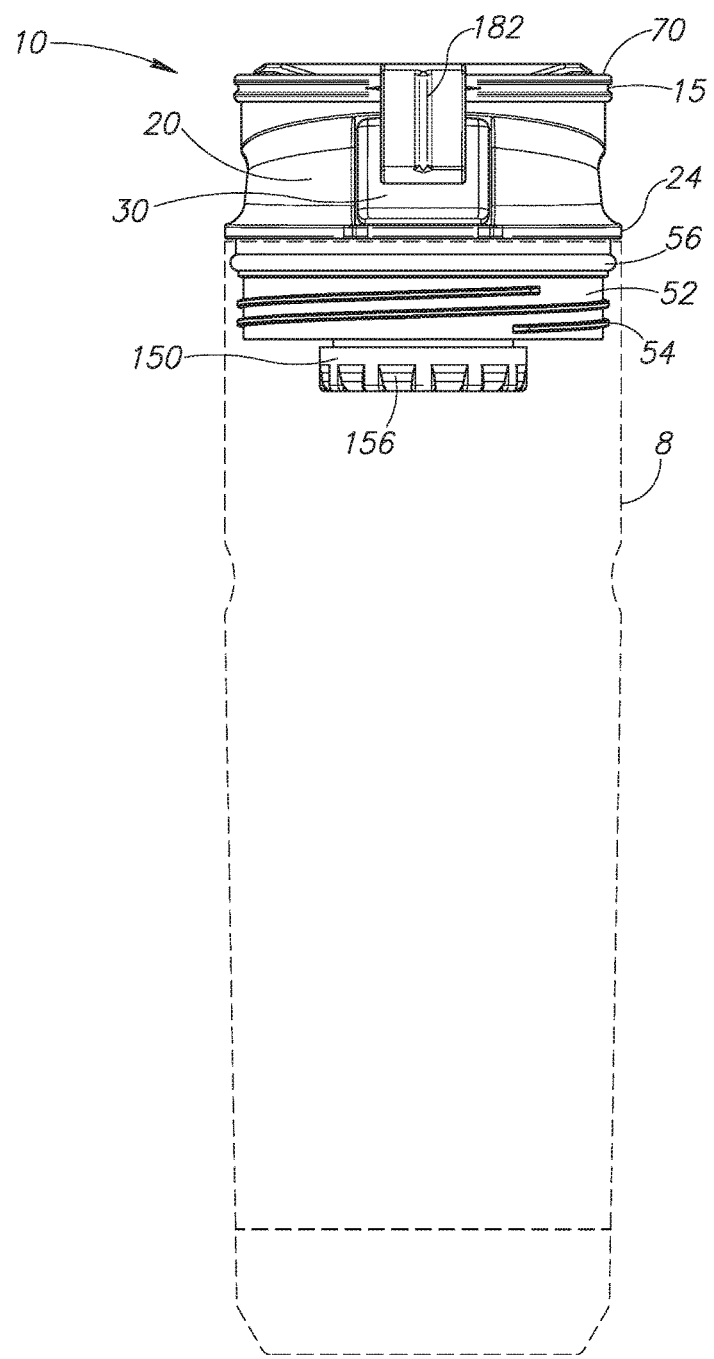
FIG. 5 is a rear elevational view of the beverage container closure of FIG. 1.
Figure 6:
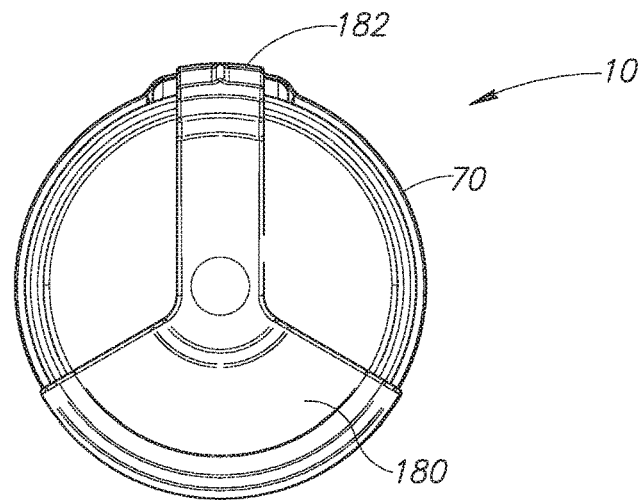
FIG. 6 is a top plan view of the beverage container closure of FIG. 1.
Figure 9:
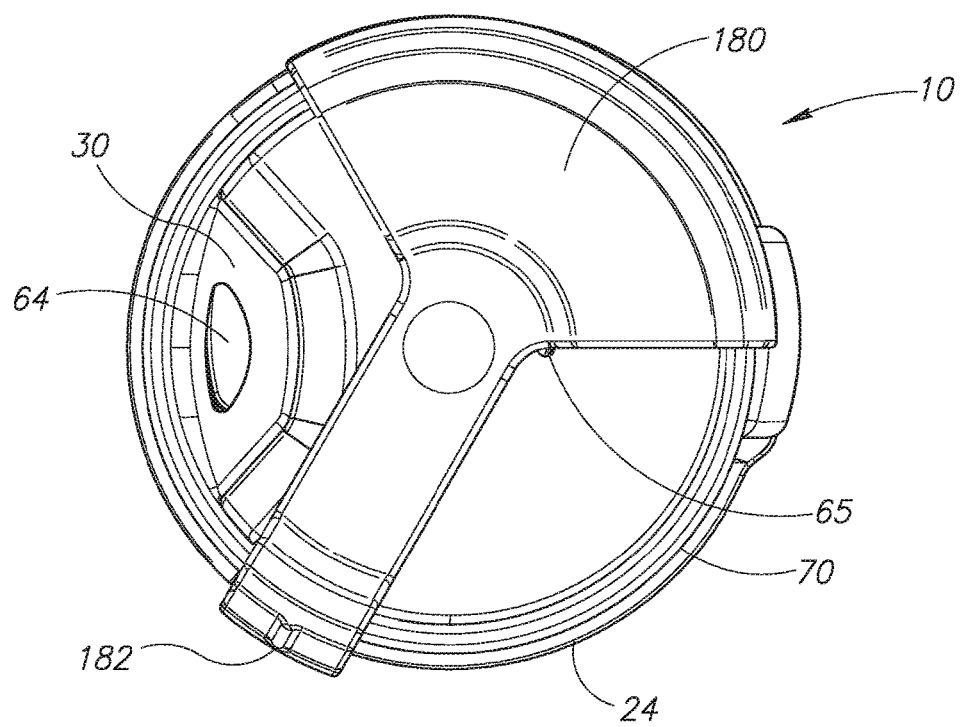
FIG. 9 is a top plan view of the beverage container closure of FIG. 8, with the dust cover rotated away from the opening in the beverage container.

The lid 10 also comprises a selectively rotatable, exterior dust cover 180 engaged with the upper portion 14 of the main body 12 that is operative to cover the openings 64 and 65 when a user is not using the lid (see FIG. 1). The dust cover 180 comprises a downwardly extending button covering portion 182 (or "actuating member covering portion" or "locking member"). The button covering portion/locking member 182 and the button 30 comprise a locking mechanism as described herein. The button covering portion 182 of the locking mechanism extends over the button 30 to prohibit accidental activation of the button 30 (and thus the actuating member 130) when the lid is not in use and the dust cover is rotated into position to cover the openings 64 and 65 (see FIG. 5), during which time the stopper 110 would be in the closed position shown in FIG. 11B. The button covering portion 182 also includes a horizontal thin strip or tongue 184 (see FIG. 10) sized to slidably fit within a horizontal corresponding groove 15 (see FIGS. 3 and 10) disposed on the perimeter of an outer surface of the upper portion 14 of the main body 12. Thus, a user may selectively rotate the dust cover 180 from a first position wherein the dust cover covers the openings 64 and 65 and a portion of the button 30 (see FIGS. 1 and 5), to a second position shown in FIGS. 8 and 9 wherein the dust cover does not cover the openings and the button so that the user may operate the lid 10 as described above to drink a fluid housed in the container 8 to which the lid is attached.

As can be appreciated, the assembly described above may be disassembled by a user for cleaning if desired. As may best be viewed in FIGS. 10 and 13, a user may simply unscrew the stopper cover 150 from the stopper cover engagement portion 22 of the main body 12, which will release the stopper 110 (and the stopper cap 170 connected thereto), the stopper cover 150, and the stopper biasing member 144 from the hollow interior region 36 of the main body. Once these components have been cleaned, the user may then reassemble the lid 10 by first inserting the stopper 110 back into the hollow interior region 36 of the main body 12. Then, the user may position the stopper biasing member 144 over the rod 161 of the stopper cover 150, and threadably connect the engagement portion 162 of the stopper cover with the stopper cover engagement portion 22 of the main body 12, thereby securing the stopper 110 within the hollow interior portion 36 of the main body.

Further, since both the actuating member 130 and the stopper 110 are biased by the button biasing member 32 and the stopper biasing member 144, respectively, the stopper 110 automatically returns to the sealed or closed position (shown in FIG. 11B) once the user removes pressure from the button 30. In this regard, the user may open and drink from the container 8 shown in FIG. 1 to which the lid 10 is attached using one hand by simply pressing the button 30 inward with a finger while consuming a beverage and releasing the button thereafter to automatically reseal the container. As can be appreciated, the ability to open, drink from, and close a container using only one hand may be desirable for various active users including bicyclists, hikers, drivers, and the like.

When the lid 10 is coupled to the open end of the container 8, in an operable position of the stopper 110 shown in FIGS. 10, 11B and 12B, the button 30 can operate the actuating member 130 (a trigger assembly), with the stopper seal 102 (a drink seal) attached to the raised portion 112 of the stopper assembly 100. The stopper 110 is manually movable between the operable position shown in FIGS. 10, 11B and 12B with the stopper at least partially within the lid, and a cleaning position with the stopper 110, preferably fully removed from within the lid as it is shown in FIG. 13. In the operable position of the stopper 110, the actuating member 130, in response to inward movement of the button 30, is capable of engaging the stopper 110 (particularly the first and second cam surfaces 133A and 133B engaging the cam surfaces 119A and 119B) for movement of the stopper 110, and hence the stopper seal 102, from the closed position to the opened position (shown in FIGS. 11B and 12B, respectively). In the cleaning position of the stopper 110, the stopper 110 is sufficiently moves outward of the lower end of the lid 10 that the actuating member 130 cannot engage the stopper 110 when the button is pressed inward (particularly the first and second cam surfaces 133A and 133B cannot engage the cam surfaces 119A and 119B) to effectuate movement of the stopper and the stopper seal from the closed position to the opened position. In the illustrated embodiment, the stopper 110 is removably positioned in the lid for movement from the operable position to the cleaning position whereat the stopper member is fully removed from the lid and detached from the lid. In alternative embodiments, the stopper 110 may be pivotally attached to the lid 10 using a multi-link arrangement for pivotal movement between the operable position and the cleaning position and can be fully or partially removed from the lid while remaining attached to the lid when in the cleaning position, or may be attached to the lid by a flexible tether and can be fully or partially removed from the lid while remaining attached to the lid when in the cleaning position.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A drinking container for u se by a user, comprising:
   a drinking container body having a container cavity with an open upper end, the container boding having a generally longitudinal axis;
   a removable drinking container body lid covering the upper end of the container cavity, the lid having a drink aperture and a vent aperture, the lid having an unlocked state and a locked state;
   a trigger assembly controlling fluid communication between the container cavity and the drink aperture and vent aperture, the trigger assembly having a non-rotatable button member movable by the user in a direction transverse to the container body longitudinal axis to actuate opening of the drink aperture when the lid is in the unlocked state to allow fluid communication between the container cavity and the drink aperture, and not sufficiently movable by the user to actuate opening of the drink aperture when the lid is in the locked state, the button member being movable by the user in the direction transverse to the container body longitudinal axis to actuate opening of the vent aperture when the lid is in the unlocked state to allow fluid communication between the container cavity and the vent aperture, and not sufficiently movable by the user to actuate opening of the vent aperture when the lid is in the locked state, movement of the button member by the user being limited to only linear movement of the entire button member; and
   a locking member positioned to prevent actuating movement of the button member by the user when the lid is in the locked state.

2. The drinking container of claim 1, wherein the lid has a top wall and an outward sidewall extending downward from the top wall, and the button member is located at the outward sidewall for movement by the user when the lid is in the unlocked state.

3. The drinking container of claim 1, wherein when the lid is in the locked state, the locking member and the button member are at least partially aligned to prevent sufficient movement of the button member by the user to allow fluid communication between the container cavity and the drink aperture, and when the lid is in the unlocked state, the locking member and the button member are sufficiently out of alignment to permit movement of the button member by the user to allow fluid communication between the container cavity and the drink aperture.

4. The drinking container of claim 3, wherein the locking member is movable between a first position and a second position, when the locking member is moved to the first position, the locking member and the button member are at least partially aligned to prevent sufficient movement of the button member by the user to allow fluid communication between the container cavity and the drink aperture, and when the locking member is moved to the second position, the locking member and the button member are sufficiently out of alignment to permit movement of the button member by the user to allow fluid communication between the container cavity and the drink aperture.

5. The drinking container of claim 1, wherein the button member is movable by the user in a first direction to actuate opening of the drink aperture when the lid is in the unlocked state, and wherein one of the locking member and the button member is movable relative to the other in a second direction different from the first direction, the one of the locking member and button member being movable in the second direction is movable in the second direction between a first position and a second position, and when moved to the first position, the locking member and the button member are at least partially aligned in the first direction to prevent sufficient movement of the button member by the user in the first direction to allow fluid communication between the container cavity and the drink aperture, and when moved to the second position, the locking member and the button member are sufficiently out of alignment in the first direction to permit movement of the button member by the user in the first direction to allow fluid communication between the container cavity and the drink aperture.

6. The drinking container of claim 1, wherein the button member is movable by the user in a first direction to actuate opening of the drink aperture when the lid is in the unlocked state, and wherein the locking member is movable in a second direction different from the first direction to change the lid from the locked state to the unlocked state, the locking member being movable in the second direction between a first position and a second position, and when moved to the first position, the locking member prevents sufficient movement of the button member by the user in the first direction to allow fluid communication between the container cavity and the drink aperture, and when moved to the second position, the locking member permits movement of the button member by the user in the first direction to allow fluid communication between the container cavity and the drink aperture.

7. The drinking container of claim 1, wherein the vent aperture is located in a top surface of the lid.

8. A drinking container for use by a user, comprising:
a drinking container body having a container cavity with an open upper end, the container boding having a generally longitudinal axis;
a removable drinking container body lid covering the upper end of the container cavity, the lid having a drink aperture and a vent aperture, the lid having an unlocked state and a locked state;
a trigger assembly controlling fluid communication between the container cavity and the drink aperture and vent aperture, the trigger assembly having a non-rotatable button member movable by the user in a first direction transverse to the container body longitudinal axis to actuate opening of the drink aperture when the lid is in the unlocked state to allow fluid communication between the container cavity and the drink aperture, and not sufficiently movable by the user in the first direction to actuate opening of the drink aperture when the lid is in the locked state, the button member being movable by the user in the first direction to actuate opening of the vent aperture when the lid is in the unlocked state to allow fluid communication between the container cavity and the vent aperture, and not sufficiently movable by the user in the first direction to actuate opening of the vent aperture when the lid is in the locked state, movement of the button member by the user being limited to only linear movement of the entire button member; and
a locking member positioned to prevent actuating movement of the button member when the lid is in the locked state.

9. The drinking container of claim 8, wherein the lid has a top wall and an outward sidewall extending downward from the top wall, and the button member is located at the outward sidewall for movement by the user when the lid is in the unlocked state.

10. The drinking container of claim 8, wherein when the lid is in the locked state, the locking member and the button member are at least partially aligned in the first direction to prevent sufficient movement of the button member by the user in the first direction to allow fluid communication between the container cavity and the drink aperture, and when the lid is in the unlocked state, the locking member and the button member are sufficiently out of alignment in the first direction to permit movement of the button member by the user in the first direction to allow fluid communication between the container cavity and the drink aperture.

11. The drinking container of claim 10, wherein one of the locking member and the button member is movable relative to the other in a second direction oriented transverse to the first direction, the one of the locking member and button member being movable in the second direction is movable in the second direction between a first position and a second position, and when moved to the first position, the locking member and the button member are at least partially aligned in the first direction to prevent sufficient movement of the button member by the user in the first direction to allow fluid communication between the container cavity and the drink aperture, and when moved to the second position, the locking member and the button member are sufficiently out of alignment in the first direction to permit movement of the button member by the user in the first direction to allow fluid communication between the container cavity and the drink aperture.

12. The drinking container of claim 8, wherein the locking member is movable in a second direction different from the first direction to change the lid from the locked state to the unlocked state, the locking member being movable in the second direction between a first position and a second position, and when moved to the first position, the locking member prevents sufficient movement of the button member by the user in the first direction to allow fluid communication between the container cavity and the drink aperture, and when moved to the second position, the locking member permits movement of the button member by the user in the first direction to allow fluid communication between the container cavity and the drink aperture.

13. The drinking container of claim 8, wherein the vent aperture is located in a top surface of the lid.

14. A drinking container for use by a user, comprising:
a drinking container body having a container cavity with an open upper end, the container boding having a generally longitudinal axis;
a removable drinking container body lid covering the upper end of the container cavity, the lid having a drink aperture, the lid having an unlocked state and a locked state;
a trigger assembly controlling fluid communication between the container cavity and the drink aperture, the trigger assembly having a non-rotatable button member movable by the user in a direction transverse to the container body longitudinal axis to actuate opening of the drink aperture when the lid is in the unlocked state to allow fluid communication between the container cavity and the drink aperture, and not sufficiently movable by the user to actuate opening of the drink aperture when the lid is in the locked state, movement of the button member by the user being limited to only linear movement of the entire button member; and
a locking member positioned to prevent actuating movement of the button member by the user when the lid is in the locked state.

15. The drinking container of claim 14, wherein the lid has a top wall and an outward sidewall extending downward from the top wall, and the button member is located at the outward sidewall for movement by the user when the lid is in the unlocked state.

16. The drinking container of claim 14, wherein when the lid is in the locked state, the locking member and the button member are at least partially aligned to prevent sufficient movement of the button member by the user to allow fluid communication between the container cavity and the drink aperture, and when the lid is in the unlocked state, the locking member and the button member are sufficiently out of alignment to permit movement of the button member by the user to allow fluid communication between the container cavity and the drink aperture.

17. The drinking container of claim 16, wherein the locking member is movable between a first position and a second position, when the locking member is moved to the first position, the locking member and the button member are at least partially aligned to prevent sufficient movement of the button member by the user to allow fluid communication between the container cavity and the drink aperture, and when the locking member is moved to the second position, the locking member and the button member are sufficiently out of alignment to permit movement of the button member by the user to allow fluid communication between the container cavity and the drink aperture.

18. The drinking container of claim 14, wherein the button member is movable by the user in a first direction to actuate opening of the drink aperture when the lid is in the unlocked state, and wherein one of the locking member and the button member is movable relative to the other in a second direction different from the first direction, the one of the locking member and button member being movable in the second direction is movable in the second direction between a first position and a second position, and when moved to the first position, the locking member and the button member are at least partially aligned in the first direction to prevent sufficient movement of the button member by the user in the first direction to allow fluid communication between the container cavity and the drink aperture, and when moved to the second position, the locking member and the button member are sufficiently out of alignment in the first direction to permit movement of the button member by the user in the first direction to allow fluid communication between the container cavity and the drink aperture.

19. The drinking container of claim 14, wherein the button member is movable by the user in a first direction to actuate opening of the drink aperture when the lid is in the unlocked state, and wherein the locking member is movable in a second direction different from the first direction to change the lid from the locked state to the unlocked state, the locking member being movable in the second direction between a first position and a second position, and when moved to the first position, the locking member prevents sufficient movement of the button member by the user in the first direction to allow fluid communication between the container cavity and the drink aperture, and when moved to the second position, the locking member permits movement of the button member by the user in the first direction to allow fluid communication between the container cavity and the drink aperture.

20. A locking mechanism operable by a user for a drinking container having a container body defining a container cavity, and a drinking container body lid having a drink aperture and a vent aperture, and covering the container cavity, the lid having an unlocked state and a locked state, the locking mechanism comprising:
   a non-rotatable button member movable by the user to actuate opening of the drink aperture when the lid is in the unlocked state to allow fluid communication between the container cavity and the drink aperture and to actuate opening of the vent aperture when the lid is in the unlocked state to allow fluid communication between the container cavity and the vent aperture, and not sufficiently movable by the user to actuate opening of the drink aperture or the vent aperture when the lid is in the locked state, movement of the button member by the user being limited to only linear movement of the entire button member; and
   a locking member on the lid positioned to prevent actuating movement of the button member when the lid is in the locked state.

21. The locking mechanism of claim 20, wherein when the lid is in the locked state, the locking member and the button member are at least partially aligned to prevent sufficient movement of the button member by the user to allow fluid communication between the container cavity and the drink aperture, and when the lid is in the unlocked state, the locking member and the button member are sufficiently out of alignment to permit movement of the button member by the user to allow fluid communication between the container cavity and the drink aperture.

22. The locking mechanism of claim 21, wherein the locking member is movable between a first position and a second position, when the locking member is moved to the first position, the locking member and the button member are at least partially aligned to prevent sufficient movement of the button member by the user to allow fluid communication between the container cavity and the drink aperture, and when the locking member is moved to the second position, the locking member and the button member are sufficiently out of alignment to permit movement of the button member by the user to allow fluid communication between the container cavity and the drink aperture.

23. The locking mechanism of claim 21, wherein the locking member is moveable in a first direction from a first position, where the button member is prevented from being actuated, to a second position, where the button member permitted to be actuated.

24. The locking mechanism of claim 20, wherein the button member is movable by the user in a first direction to actuate opening of the drink aperture when the lid is in the unlocked state, and wherein the locking member is movable in a second direction different from the first direction to change the lid from the locked state to the unlocked state, the locking member being movable in the second direction between a first position and a second position, and when moved to the first position, the locking member prevents sufficient movement of the button member by the user in the first direction to allow fluid communication between the container cavity and the drink aperture, and when moved to the second position, the locking member permits movement of the button member by the user in the first direction to allow fluid communication between the container cavity and the drink aperture.

25. The drinking container of claim 20, wherein the vent aperture is located in a top surface of the lid.

26. A locking mechanism operable by a user for a drinking container having a container body defining a container cavity, and a drinking container body lid having a drink aperture and covering the container cavity, the lid having an unlocked state and a locked state, the locking mechanism comprising:
   a non-rotatable button member movable by the user in a first direction to actuate opening of the drink aperture when the lid is in the unlocked state to allow fluid communication between the container cavity and the drink aperture, and not sufficiently movable by the user in the first direction to actuate opening of the drink aperture when the lid is in the locked state, movement of the button member by the user being limited to only linear movement of the entire button member; and
   a locking member on the lid positioned to prevent actuating movement of the button member in the first direction when the lid is in the locked state,
   wherein when the lid is in the locked state, the locking member prevents sufficient movement of the button member by the user in the first direction to allow fluid communication between the container cavity and the drink aperture, and when the lid is in the unlocked state, the locking member permits movement of the button member by the user in the first direction to allow fluid communication between the container cavity and the drink aperture; and wherein the locking member is movable in a second direction oriented transverse to the first direction to change the lid from the locked state to the unlocked state, the locking member being movable in the second direction between a first position and a second position, and when moved to the first position, the locking member prevents sufficient movement of the button member by the user in the first direction to allow fluid communication between the container cavity and the drink aperture, and when moved to the second position, the locking member permits movement of the button member by the user in the first direction to allow fluid communication between the container cavity and the drink aperture.

27. The locking mechanism of claim 26, wherein the first direction of movement of the button member is generally transverse to a longitudinal axis of the container body, and the locking member movement in the second direction is rotatable movement about the longitudinal axis of the container body.

28. The locking mechanism of claim 26, wherein the locking member is moveable in the second direction from a first position, where the button member is prevented from being actuated, to a second position, where the button member permitted to be actuated.

29. A locking mechanism operable by a user for a drinking container having a container body defining a container cavity, and a drinking container body lid covering the container cavity, the lid having a seal assembly to control fluid communication between a drink aperture and the container body, the lid having an unlocked state and a locked state, the locking mechanism comprising:

a non-rotatable button member moveable by a user in a first direction from a first position toward an interior of the lid to a second position to actuate opening of the drink aperture when the lid is in the unlocked state to allow fluid communication between the container cavity and the drink aperture, movement of the button member by the user being limited to only linear movement of the entire button member; and a locking member on the lid positioned to prevent movement of the button member from the first position to the second position when the lid is in the locked state, wherein when the lid is in the locked state, the locking member and the button member are at least partially aligned in the first direction to prevent movement of the button member by the user in the first direction from the first position to the second position, and when the lid is in the unlocked state, and the locking member and the button member are sufficiently out of alignment in the first direction to permit movement of the button member by the user in the first direction from the first position to the second position, and wherein one of the locking member and the button member is movable relative to the other in a second direction oriented transverse to the first direction, the one of the locking member and button member being movable in the second direction is movable in the second direction between a third position and a fourth position, and when moved to the third position, the locking member and the button member are at least partially aligned in the first direction to prevent movement of the button member by the user in the first direction from the first position to the second position, and when moved to the fourth position, the locking member and the button member are sufficiently out of alignment in the first direction to permit movement of the button member by the user in the first direction from the first position to the second position.

30. The locking mechanism of claim 29, wherein the first direction of movement of the button member is generally transverse to a longitudinal axis of the container body, and wherein the one of the locking member and button member being movable in the second direction is rotatable about the longitudinal axis of the container body.

31. A locking mechanism operable by a user for a drinking container having a container body defining a container cavity, and a drinking container body lid covering the container cavity, the lid having a seal assembly to control fluid communication between a drink aperture and the container body, the lid having an unlocked state and a locked state, the locking mechanism comprising:

a non-rotatable button member moveable by a user in a first direction from a first position toward an interior of the lid to a second position to actuate opening of the drink aperture when the lid is in the unlocked state to allow fluid communication between the container cavity and the drink aperture, movement of the button member by the user being limited to only linear movement of the entire button member; and a locking member on the lid positioned to prevent movement of the button member from the first position to the second position when the lid is in the locked state, wherein the locking member is movable in a second direction, which is different than the first direction, from a third position to a fourth position, when the lid is in the locked state, the locking member is in the third position whereat the button member is prevented from being moved in the first direction from the first position to the second position by the locking member, and when the lid is in the unlocked state, the locking member is in the fourth position whereat the button member is moveable in the first direction from the first position to the second position, and wherein the first direction of movement of the button member is generally transverse to a longitudinal axis of the container body, and wherein the second direction of movement of the locking member is generally transverse to the longitudinal axis of the container body.

32. A locking mechanism operable by a user for a drinking container having a container body defining a container cavity, and a drinking container body lid covering the container cavity, the lid having a seal assembly to control fluid communication between a drink aperture and the container body, the lid having an unlocked state and a locked state, the locking mechanism comprising:

a non-rotatable button member moveable by a user in a first direction from a first position toward an interior of the lid to a second position to actuate opening of the drink aperture when the lid is in the unlocked state to allow fluid communication between the container cavity and the drink aperture, movement of the button member by the user being limited to only linear movement of the entire button member; and a locking member on the lid positioned to prevent movement of the button member from the first position to the second position when the lid is in the locked state, wherein one of the locking member and the button member is movable relative to the other in a second direction oriented transverse to the first direction, the one of the locking member and button member being movable in the second direction is movable in the second direction between a third position and a fourth position, and when moved to the third position, the locking member and the button member are at least partially aligned in the first direction to prevent movement of the button member by the user in the first direction from the first position to the second position, and when moved to the fourth position, the locking member and the button member are sufficiently out of alignment in the first direction to permit movement of the button member by the user in the first direction from the first position to the second position.

33. The locking mechanism of claim 32, wherein the second direction of movement is generally transverse to a longitudinal axis of the container body.

34. A lid assembly for a beverage container comprising:
a lid housing having a drink opening and an air vent, the lid housing configured for removable attachment to the beverage container;
a seal assembly connected to the lid housing and having a drink seal movable between a closed position closing the drink opening and an opened position opening the drink opening;
a trigger assembly connected to the lid housing to operate the seal assembly; and
a lock connected to the lid housing, the lock movable to a first position in which the lock prevents the trigger assembly operably engaging the seal assembly to move the drink seal from the closed position closing the drink opening to the opened position opening the drink opening and to a second position in which the lock does not prevent the trigger assembly operably engaging the seal assembly, when the lock is in the first position the lock is positioned over the air vent and when the lock is in the second position the lock is not positioned over the air vent.

35. The lid assembly of claim 34, wherein the lock contains a visual indicator to indicate that the lock is in the first position.

36. The lid assembly of claim 34, wherein the lock is pivotally connected to the lid housing.

37. The lid assembly of claim 34, wherein the lock extends from a top of the lid housing.

38. The lid assembly of claim 34, wherein one of the lid housing and the lock has a detent, and the other of the lid housing and the lock has a protrusion, the detent and protrusion providing a snap-fit to maintain the lock in the first position until a user switches the lock to the second position.

39. A lid assembly for a beverage container comprising:
a lid housing having a drink opening, the lid housing configured for removable attachment to the beverage container;
a seal assembly connected to the lid housing and having a drink seal movable between a closed position closing the drink opening and an opened position opening the drink opening;
a lock connected to a top of the lid housing, the lock moveable to a locked position to prevent operable engagement of the seal assembly so that the drink seal remains in the closed position closing the drink opening; and
a trigger to engage the seal assembly to have the seal assembly selectively move the drink seal between the closed and opened positions, wherein the lock prevents the trigger from operably engaging the seal assembly, and wherein the trigger moves transverse to a longitudinal axis of the beverage container.

40. The lid assembly of claim 39, wherein the lock contains a visual indicator to indicate that the lock is in the locked position.

41. The lid assembly of claim 39, wherein the lock is connected adjacent a top surface of the lid housing.

42. A lid assembly for a beverage container comprising:
a lid housing having a drink opening, the lid housing configured for removable attachment to the beverage container;
a seal assembly connected to the lid housing and having a drink seal movable between a closed position closing the drink opening and an opened position opening the drink opening;
a lock connected to a top of the lid housing, the lock moveable to a locked position to prevent operable engagement of the seal assembly so that the drink seal remains in the closed position closing the drink opening; and
a trigger to engage the seal assembly to selectively move the drink seal from the closed position to the opened position, wherein the trigger moves transverse to a longitudinal axis of the beverage container.

43. The lid assembly of claim 42, wherein the seal assembly is movably connected to the lid housing and movable between a first or operable position, wherein the drink seal is moveable between the closed and opened positions, and a second or cleaning position, wherein the seal assembly is moved away from a surface portion of the lid housing through which the drink opening extends and wherein the drink opening is open for cleaning the lid assembly.

44. A lid assembly for a drinking container comprising:
a lid housing having a drink opening and a separate vent aperture, the lid housing configured for removable attachment to the drinking container;
a seal assembly including a drink seal and a vent seal, the seal assembly being movably connected to the lid housing and movable between a first or operable position, where the drink seal engages the drink opening to close the drink opening and the vent seal engages the vent aperture to close the vent aperture, and a second or cleaning position, where the seal assembly is moved away from a surface portion of the lid housing through which the drink opening extends and the drink opening is open for cleaning the lid assembly;
a trigger mechanism operably connected to the seal assembly during operation of the trigger mechanism to move each of the drink seal and a vent seal from a closed position to an opened position; and
a lock connected to the lid housing, the lock moveable between a first or locked position and a second or unlocked position, to prevent operable engagement of the seal assembly by the trigger assembly when the lock is in the locked position and the seal assembly is in the first or operable position.

45. The lid assembly of claim 44, wherein the trigger assembly comprises a main body having a distal end that selectively operates the seal assembly.

46. A drinking container comprising:
a drinking container body having a generally longitudinal axis; and
a lid assembly removably attached to the drinking container body, having:
a) a lid housing having a drink opening;

b) a seal assembly having a drink seal movable between a closed position closing the drink opening and an opened position opening the drink opening;

c) a trigger assembly inwardly movable transverse to the longitudinal axis of the beverage container to operate the seal assembly to move the drink seal from the closed position to the opened position; and, d) a lock movable to a first position in which the lock prevents inward movement of the trigger assembly sufficient to prevent operation of the seal assembly and thereby retain the drink seal in the closed position.

47. The drinking container of claim 46, wherein the lid assembly further includes a biasing member biasing the drink seal into the closed position.

48. A drinking container for use by a user, comprising:
a drinking container body having a container cavity with an open upper end and having a longitudinal axis;
a removable drinking container body lid covering the upper end of the container cavity, the lid having a drink aperture;
a drink seal movable between a closed position closing the drink aperture and an opened position opening the drink aperture;
a button operably connected to the drink seal and manually inwardly movable transverse to the longitudinal axis of the container body to move the drink seal from the closed position to the opened position, the button being located at an outward sidewall of the lid; and
a locking member movable between a locked position and an unlocked position, in the locked position the locking member preventing manual inward movement of the button to prevent movement of the drink seal from the closed position to the opened position, and in the unlocked position the locking member permitting manual inward movement of the button to move the drink seal from the closed position to the opened position.

49. A drinking container for use by a user, comprising:
a drinking container body having a container cavity with an open upper end, wherein the drinking container body has a generally longitudinal axis;
a removable drinking container body lid covering the upper end of the container cavity, the lid having a drink aperture;
a drink seal movable between a closed position closing the drink aperture and an opened position opening the drink aperture;
a button operably connected to the drink seal and manually inwardly movable to move the drink seal from the closed position to the opened position, the inward movement of the button to move the drink seal from the closed position to the opened position being in a direction transverse to the container body longitudinal axis; and
a locking member movable between a locked position and an unlocked position, in the locked position the locking member preventing manual inward movement of the button to prevent movement of the drink seal from the closed position to the opened position, and in the unlocked position the locking member permitting manual inward movement of the button to move the drink seal from the closed position to the opened position.

50. The drinking container of 49, wherein the button is a non-rotatable button member.

51. The drinking container of 49, wherein movement of the button is limited to only linear movement of the entire button.

52. A drinking container for use by a user, comprising:
a drinking container body having a container cavity with an open upper end;
a removable drinking container body lid covering the upper end of the container cavity, the lid having a drink aperture;
a drink seal movable between a closed position closing the drink aperture and an opened position opening the drink aperture;
a button operably connected to the drink seal and manually inwardly movable to move the drink seal from the closed position to the opened position; and
a locking member movable between a locked position and an unlocked position, in the locked position the locking member preventing manual inward movement of the button to prevent movement of the drink seal from the closed position to the opened position, and in the unlocked position the locking member permitting manual inward movement of the button to move the drink seal from the closed position to the opened position, wherein the locking member is rotatably attached to the lid.

53. A drinking container for use by a user, comprising:
a drinking container body having a container cavity with an open upper end;
a removable drinking container body lid covering the upper end of the container cavity, the lid having a drink aperture;
a drink seal movable between a closed position closing the drink aperture and an opened position opening the drink aperture;
a button operably connected to the drink seal and manually inwardly movable to move the drink seal from the closed position to the opened position; and
a locking member movable between a locked position and an unlocked position, in the locked position the locking member preventing manual inward movement of the button to prevent movement of the drink seal from the closed position to the opened position, and in the unlocked position the locking member permitting manual inward movement of the button to move the drink seal from the closed position to the opened position, wherein the locking member has at least a top portion extending from a top of the lid.

54. The lid assembly of claim 53, wherein the top portion of the locking member is positioned over a vent aperture in the lid when the locking member is in the locked position.

55. A drinking container for use by a user, comprising:
a drinking container body having a container cavity with an open upper end;
a removable drinking container body lid covering the upper end of the container cavity, the lid having a drink aperture;
a drink seal movable between a closed position closing the drink aperture and an opened position opening the drink aperture;
a button operably connected to the drink seal and manually inwardly movable to move the drink seal from the closed position to the opened position; and
a locking member movable between a locked position and an unlocked position, in the locked position the locking member preventing manual inward movement of the button to prevent movement of the drink seal from the closed position to the opened position, and in the unlocked position the locking member permitting manual inward movement of the button to move the drink seal from the closed position to the opened position, wherein the lid has a top wall and an outward sidewall extending downward from the top wall, and the button is located at the outward sidewall for inward movement when the locking member is in the unlocked position.

56. A drinking container for use by a user, comprising:
a drinking container body having a container cavity with an open upper end;
a removable drinking container body lid covering the upper end of the container cavity, the lid having a drink aperture, wherein the lid further includes a vent aperture is-located in a top surface of the lid;
a drink seal movable between a closed position closing the drink aperture and an opened position opening the drink aperture;
a button operably connected to the drink seal and manually inwardly movable to move the drink seal from the closed position to the opened position; and
a locking member movable between a locked position and an unlocked position, in the locked position the locking member preventing manual inward movement of the button to prevent movement of the drink seal from the closed position to the opened position, and in the unlocked position the locking member permitting manual inward movement of the button to move the drink seal from the closed position to the opened position.

57. The drinking container of claim 49, wherein movement of the locking member between the locked position and the unlocked position is in a direction different from the inward direction of movement of the button to move the drink seal from the closed position to the opened position.

58. The drinking container of claim 49, wherein when the locking member is in the locked position, the locking member and the button are at least partially aligned to prevent manual inward movement of the button.

59. A drinking container for use by a user, comprising:
a drinking container body having a container cavity with an open upper end;
a removable drinking container body lid covering the upper end of the container cavity, the lid having a drink aperture;
a drink seal movable between a closed position closing the drink aperture and an opened position opening the drink aperture;
a button operably connected to the drink seal and manually inwardly movable to move the drink seal from the closed position to the opened position; and
a locking member movable between a locked position and an unlocked position, in the locked position the locking member preventing manual inward movement of the button to prevent movement of the drink seal from the closed position to the opened position, and in the unlocked position the locking member permitting manual inward movement of the button to move the drink seal from the closed position to the opened position, wherein the lid has a vent aperture and the drinking container further includes a vent seal movable between a closed position closing the vent aperture and an opened position opening the vent aperture, the button being operably connected to the vent seal and manually inwardly movable to move the vent seal from the closed position to the opened position.

60. The drinking container of claim 49, wherein the button operates a trigger assembly and the drink seal is attached to a stopper manually movable between an operable position and a cleaning position, in the operable position of the stopper, the stopper is at least partially within the lid and the trigger assembly is capable of engaging the stopper for movement of the drink seal from the closed position to the opened position, and in the cleaning position of the stopper, the trigger assembly cannot engage the stopper for movement of the drink seal from the closed position to the opened position.

61. The drinking container of claim 60, wherein the stopper is removably positioned in the lid for movement from the operable position to the cleaning position whereat the stopper is fully removed from the lid.

* * * * *